(12) United States Patent
Bindouski et al.

(10) Patent No.: US 12,118,265 B2
(45) Date of Patent: Oct. 15, 2024

(54) METHOD, SYSTEM AND APPARATUS FOR ACCESSING A USER INTERFACE OF A MOBILE COMPUTER

(71) Applicant: 3HAND LLC, Wilmington, DE (US)

(72) Inventors: Uladzimir Bindouski, Minsk (BY); Siarhei Kuchun, Minsk (BY)

(73) Assignee: 3HAND LLC, Wilmington, DE (US)

( * ) Notice: Subject to any disclaimer, the term of this patent is extended or adjusted under 35 U.S.C. 154(b) by 0 days.

(21) Appl. No.: 18/501,606

(22) Filed: Nov. 3, 2023

(65) Prior Publication Data

US 2024/0192910 A1 Jun. 13, 2024

Related U.S. Application Data

(60) Provisional application No. 63/431,051, filed on Dec. 8, 2022.

(51) Int. Cl.
*G06F 3/14* (2006.01)
*H04L 65/60* (2022.01)
*H04L 67/56* (2022.01)
*H04L 69/08* (2022.01)

(52) U.S. Cl.
CPC ............ *G06F 3/1454* (2013.01); *H04L 65/60* (2013.01); *H04L 67/56* (2022.05); *H04L 69/08* (2013.01)

(58) Field of Classification Search
CPC .................................................... G06F 3/1454
See application file for complete search history.

(56) References Cited

U.S. PATENT DOCUMENTS

2018/0113669 A1* 4/2018 Szeto .................. G06F 3/04815

* cited by examiner

*Primary Examiner* — Robin J Mishler

(57) ABSTRACT

Remote access to the user interface of a mobile computer is carried out by simultaneous use of the screen broadcast function and the data reception functionality of the interface of peripheral input devices of this mobile computer to interact with a remote control computer via an IP network. Routing of mobile computer screen broadcast streams to the control computer can be carried out on a local network, e.g., through DHCP or mDNS (DNS-SD) services, and relaying to other networks through an appropriate proxy server. The conversion of IP manipulation data coming from the control computer to the mobile computer interface is carried out using a gateway with IP and HID interfaces. The invention can be implemented both on the basis of one device with Bluetooth HID or USB HID options, and on the basis of a local network of a mobile computer containing routers and gateways with appropriate properties.

11 Claims, 9 Drawing Sheets

METHOD, SYSTEM AND APPARATUS FOR ACCESSING A USER INTERFACE OF A MOBILE COMPUTER

CROSS-REFERENCE TO RELATED APPLICATIONS

This application claims the benefit of U.S. Provisional Application No. 63/431,051, filed Dec. 8, 2022, which is incorporated herein by reference in its entirety.

TECHNICAL FIELD OF THE INVENTION

The present invention generally relates to technology for remote computer control and, more specifically, to remote access to a user interface of a mobile computer while simultaneously using a built-in screen broadcasting functions and receiving data by the user interface of the mobile computer from HID peripheral input devices.

BACKGROUND OF THE INVENTION

Currently, remote computer management services provided for private and corporate users have become an integral part of the information technology market. The volume of this segment of the IT market tends to constantly grow, including in response to the widespread transition to remote work without the need for the employee to be physically present in the office.

In addition, the number of potentially remotely controlled mobile computers is constantly growing due to the increasingly popular BYOD (Bring Your Own Device) trend, which allows corporations to provide employees with access to internal networks remotely using mobile devices according to their choice. At the same time, these mobile devices are managed and configured for correct corporate use remotely with minimal disruption to employees' schedules. Typically, most BYOD devices are computers with mobile operating systems.

For remote access to a PC with the appropriate operating system (for example, a server, PC, laptop, MacBook, desktop computer, etc.), the technologies have already been sufficiently developed and are quite satisfactory for users. In the case of remote access to server equipment, KVM switches are sometimes used to switch the interfaces of peripheral devices of the managed computer to the corresponding peripheral devices of the managing computer. In other cases, remote access operators provide services based on a system in which a remote user accesses a managed computer through appropriate applications installed on the control and managed computers, which communicate with each other through a network environment provided by the respective service providers.

There are patented methods and systems (for example, US20050202388A1, US20050201404A1, U.S. Pat. No. 7,114,018B1, U.S. Pat. No. 7,260,624B2, etc.) using a remote access or interaction device that physically connects to the user interfaces of the managed PC and broadcasts the corresponding traffic from (or to) peripheral devices of the control computer. It is clear that these concepts relate only to PCs with a physical video interface and are not used in practice, since PC users are quite satisfied with the above-mentioned solutions that are easier to use.

The presented new technology is distinguished by the fact that it is based on the simultaneous use of the built-in screen broadcast function of a mobile computer and the functionality of the interface of peripheral input devices (including HID devices) of the mobile computer. In addition, the claimed invention can be implemented both on the basis of the same access device with interface options for peripheral input devices and relay of screen broadcast streams, and on the basis of a local network of the presence of a mobile computer, already containing physical or logical components with the appropriate properties.

The capabilities of remote control of computers with a mobile operating system (for example, iOS or Android) differ from the capabilities of remote control of a PC due to the increased level of required user security, since a mobile computer is a much more personalized device and may contain a large amount of confidential data about a specific user. In addition, security requirements for specific features of mobile computers change regularly as the functionality of mobile computers increases.

The option to share the screen of a mobile computer on a remote computer is implemented by almost all remote access operators for Android and iOS mobile computers, which are used in huge quantities by the vast majority of users. Recently, it has become possible to remotely access the user interface of most Android mobile computers using an application and plugin that corresponds to a specific hardware platform of the mobile computer. Remote access to the user interface of iOS mobile computers (iPadOS) is still not available, since the manufacturer of these computers includes serious restrictions in its operating system for third-party developers in accordance with its security policy.

It is clear that there is a request among many users to implement remote access to the user interface of mobile computers running iOS (iPadOS). In addition, it is known that among BYOD devices, the majority of computers are iOS (iPadOS).

Therefore, there is a need to provide an alternative technology for remote access to the user interface of mobile computers while maintaining the manufacturer's security requirements for the benefit of ordinary users.

SUMMARY OF THE INVENTION

In order to understand the essence of the invention, the concept of the invention is first briefly described below. It is well known that Android and iOS (iPadOS) mobile computers have a built-in function for broadcasting the screen on a local network to a display device (TV, monitor of another computer, etc.). Using a proxy server with the appropriate properties, the screen of this mobile computer can also be broadcast to other networks, including via the Internet. In addition, Android and iOS (iPadOS) mobile computers have a built-in function to receive input manipulation data from peripheral input devices, including HID devices.

Access to the user interface of a mobile computer in the proposed concept is carried out by simultaneous use of the built-in screen broadcast function and the built-in functionality of receiving data by the interface of peripheral input devices of the mobile computer to interact with a remote control computer via an IP network. Routing of outgoing screen broadcast streams to the control computer can be carried out on the local network through the appropriate services (for example, DHCP or mDNS (DNS-SD)), to other networks—through the appropriate proxy server (for example, Avahi). Conversion of IP data arriving (incoming) from the control computer to the interface of peripheral input devices of the mobile computer is carried out by an appropriate gateway with IP interfaces and interfaces for HID devices.

Thus, the system for accessing the user interface of a mobile computer, implemented on the basis of the proposed method, controls the outgoing and incoming data flow of screen translation and manipulation of the interface of peripheral input devices, respectively.

The present invention can be implemented both on the basis of the same device with interface options for HID devices and relaying screen broadcast streams, and on the basis of a local network of the presence of a mobile computer containing physical or logical routers, gateways and a proxy server with corresponding properties.

For example, you can add these functions to the functionality of any "standard" network devices: routers, wireless routers, computers, a gateway for IoT devices, smartphones, smart speakers, etc. It is also possible to use compact devices based on microcomputers, for example in the format of IoT devices. The invention is applicable to control the user interface of computers of any type and format, including computers manufactured by Apple Corporation.

Next, as an example, we will briefly consider some new capabilities and exemplary scenarios for using the technical results of the proposed method for remote access to the user interface of a mobile computer in the smartphone format, unknown in the previous level of technology.

For example, a user's smartphone is connected to a wireless network that is created in a household, office or any educational institution and contains the appropriate functionality for relaying mobile computer screen broadcast data to the control computer and converting IP data arriving at the mobile HID device interface computer from a peripheral input device of a remote control computer.

If it is necessary to remotely access this smartphone, the user activates the screen broadcast function to the corresponding "receiving" device (logical or physical) and connects via the Bluetooth HID connection of the smartphone interface to the corresponding conversion gateway (logical or physical). Next, the control computer located on the same local or global network gains access to the user interface of this smartphone.

The smartphone user controls remote manipulation of the user interface and can interrupt remote control at any time. Since the Bluetooth coverage area, when using appropriate repeaters, is comparable to the Wi-Fi coverage area, the user can move freely within the wireless network access area.

Another scenario for the application of the claimed invention involves the use of a small-sized device equipped with Bluetooth and Wi-Fi interfaces with the function of relaying smartphone screen broadcast data to the control computer and the function of converting IP manipulation data coming to the HID interface of the smartphone from the peripheral input device of the remote control computer.

This device has one connection to the local Wi-Fi network of the presence of the user's smartphone, and a second connection via Bluetooth to the HID interface of the device of this smartphone. The user interface access device functions simultaneously as a relay of smartphone screen broadcast data to the control computer and as a gateway for converting the HID interface manipulation data of a given smartphone from IP to HID protocols from the control computer. In this scenario, the application of the claimed invention is more mobile and is applicable in any networks at the request of the user. Otherwise, the functionality of the technology is the same in both examples.

To display the broadcast of the smartphone screen on the monitor of the control computer and broadcast the manipulation data of the peripheral input devices of the smartphone from the peripheral input devices of the control computer, the corresponding software of the control computer is used. For example, a keyboard and pointing devices (mouse, joystick, touchpad, etc.) can be used as peripheral devices of the control computer.

In addition, to control the user interface of a mobile computer, you can use the corresponding options of the Android (Switch Access) and iOS (Switch Control) mobile operating systems, when the peripheral devices of the control computer in the form of hardware switches or corresponding keyboard buttons functionally replace pointing peripheral devices. These options link various actions on the smartphone user interface to changes in the state of the physical keys on the host computer's keyboard, allowing interaction with the smartphone's touch screen. Accordingly, interaction with the user interface of the controlled smartphone is carried out through the keyboard buttons of the control computer.

The application scenarios of the claimed invention are given above only as an example to understand the essence of the invention and do not cover all possible interpretations and applications, which are limited only by the claims and its equivalents. Next, the essence of the invention is discussed in more detail in accordance with the claimed claims.

The technical problem to which the claimed invention is aimed can be formulated as the development of a method for accessing the user interface of a mobile computer, taking into account the fact that access to the user interface is carried out under the control of the user using the built-in functions of the mobile computer.

In some embodiments, the technical result is achieved by a method of access to a user interface of a mobile computer from a controlling computer, the method including: simultaneously using an embedded function of broadcast of a screen of the mobile computer and an embedded function of data reception by an interface of peripheral input devices of the mobile computer; using the embedded function of broadcast of the screen of the mobile computer for broadcasting of the screen of the mobile computer on the controlling computer; using the embedded function of reception data representing manipulation by the interface of the peripheral input devices of the mobile computer coming over a network from a peripheral input device of the controlling computer after converting IP into corresponding protocols of manipulating, by the interface, the peripheral devices of input of the mobile computer; displaying a broadcast of the screen of the mobile computer on the screen of the controlling computer; and manipulating by the interface of the peripheral input devices of the mobile computer corresponding ones of the peripheral input devices of the controlling computer.

Thus, aspects of the proposed method set forth in this patent application, along with the simultaneous use of the screen broadcast function and the function of receiving HID interface manipulation data, provide the technical result of remote access to the user interface of a mobile computer (including, in addition, computers of any type) for interaction with a remote control computer via a network via IP (FIG. 1).

A summary of the material necessary to understand the essence of the invention will be presented below in the order of content of the claims.

In one aspect, the present invention includes a method that includes broadcasting the screen of a mobile computer to a control computer on a local network (FIG. 2). That is, the managed mobile computer and the managing computer are connected to the same local network, and routing of mobile computer screen broadcast streams to the managing computer can be carried out, for example, through DHCP or mDNS (DNS-SD) services.

In another aspect, this invention includes a method that includes relaying live streams of a mobile computer screen to a control computer to other networks (for example, corporate networks), including through a global network (FIG. 1). That is, the managed mobile computer and the control computer can be connected through a network gateway, through other local networks or via the Internet, and relaying of mobile computer screen broadcast data from the local network to the control computer can be carried out through an appropriate proxy server, for example, Avahi.

In another aspect, the present invention includes a method that includes a corresponding conversion gateway for converting IP data supplied to a mobile computer input peripheral interface from a control computer input peripheral into corresponding mobile computer input peripheral interface manipulation protocols (FIG. 1). That is, the conversion of IP manipulation data into the HID protocol is carried out by the corresponding gateway with IP and HID interfaces.

One embodiment of this aspect comprises connecting the IP interface of the conversion gateway to the local network presence of the mobile computer and directly connecting the interface of the input device of the conversion gateway to the corresponding interface of the mobile computer (FIGS. 1 and 2). That is, in this case, the manipulation data comes to the IP interface of the conversion gateway from the local network of the presence of the mobile computer and then, after conversion, through a direct wired or wireless connection to the HID interface of the mobile computer.

One aspect of this embodiment comprises directly connecting the mobile computer's input peripheral interface to the additional input device interfaces without a conversion gateway, which are used to access the mobile computer's user interface in conjunction with broadcasting the mobile computer's screen to the host computer's monitor (FIG. 3). That is, in the case where the mobile computer and the control computer are operated simultaneously and are physically accessible by the same user, the conversion gateway is not used, and input devices (such as a mouse and keyboard) are connected directly to the mobile computer interface, which are manipulated by the control user computer, while simultaneously using the display of the mobile computer screen on the monitor of the control computer to manipulate the graphical interface of the mobile computer. Thus, the user directly from his personal computer receives legal and secure access to control the user interface of his mobile computer.

Another embodiment of the aspect of using the conversion gateway includes connecting the IP interface of the conversion gateway to a network other than the local network of the presence of the mobile computer and an HID interface for directly connecting to the corresponding HID interface of the mobile computer (FIG. 4). That is, in this case, manipulation data arrives at the IP interface of the conversion gateway after appropriate routing from other networks (including the Internet) and then after conversion through a direct wired or wireless connection to the HID interface of the mobile computer.

In yet another aspect, the present invention includes a method that includes screen casting and manipulation data conversion from IP to HID implemented by the local presence network functionality of a mobile computer (FIG. 1). That is, this local network already contains routers and gateways with the appropriate properties. Thus, the mobile computer has the ability to broadcast the screen and receive HID interface manipulation data using the functionality of the local network without installing additional equipment for each remote access session.

In a further aspect, the present invention includes a method that includes screen broadcasting and IP to HID manipulation data conversion implemented by the functionality of the same device with a mobile computer screen broadcast data relaying function and an IP manipulation data conversion function coming to HID interface (FIG. 5). This device has one connection to the mobile computer's local presence network and a second connection to the mobile computer's HID interface. The device functions simultaneously as a screen broadcast data relay and as a gateway for converting HID interface manipulation data from IP to HID protocols.

In another aspect, the present invention includes a method that includes broadcasting a screen and receiving interface manipulation data over a mobile IP network to which a mobile computer is connected (FIG. 6). That is, access to the user interface is carried out via a mobile IP network quickly anywhere and at any time at the user's request. And the functions of screen relaying and converting manipulation data from IP to HID can be performed, for example, by a mobile device with the appropriate characteristics, which is located on the same network as the mobile computer, accessed through a wireless access point activated on the mobile computer.

In a further aspect, the present invention includes a method that includes screen translation and conversion of interface manipulation data from IP into mobile computer user interface control commands implemented by the functionality of third-party applications installed on the mobile computer (FIG. 7). That is, users, in principle, have the opportunity to use not only the "ready-made" functionality of the user interface of a mobile computer, but also third-party applications installed by users, developed based on the screen broadcast functions of the operating system. In addition, users also have the opportunity to install third-party applications that convert commands in IP format from a remote control computer into commands for controlling the graphical interface of a mobile computer using the functions of the operating system without the use of logical and hardware network resources and third-party equipment. For example, you can use the appropriate accessibility options of the Android operating system (Switch Access).

In yet another aspect, the present invention includes a method that includes activating screen casting functions and an HID interface directly by a user of a mobile computer. That is, both the screen translation function and the HID interface access function are activated directly by the user. Thus, an appropriate level of safety in the practical use of the claimed invention is achieved.

In a further aspect, the present invention includes a method that includes accessing a user interface of any type of computer from a control computer. That is, the invention is applicable to control the user interface of computers of any type and format, but to a greater extent it is relevant for computers with mobile operating systems (for example, iOS, iPadOS), since existing technologies at the previous level of technology are more applicable to computers of other types formats. (FIG. 1).

As a consequence of the application of the technical result of the method described above, an invention is claimed for a system for accessing the user interface of a mobile computer from a control computer.

The technical problem to be solved by the claimed invention can be formulated as the development of a new system containing the appropriate hardware and logical components necessary to access the user interface of a mobile computer from the first and second control computer using the built-in functions of the mobile computer.

The technical result is that the mobile computer adequately responds to manipulation of the interface of the peripheral input devices of the mobile computer by the corresponding peripheral input devices of the first and second control computer, and is achieved through the use in several aspects of the system for accessing the user interface of the mobile computer (FIG. 8), comprising:

a mobile computer that has one a local network connection for user-activated screen casting, and a second user-activated input peripheral interface connection to the conversion gateway, a gateway for converting IP manipulation data received from a control computer into an appropriate format for an input peripheral device interface of a mobile computer, which includes an IP interface connected to a computer network for receiving input peripheral input device manipulation data in IP format from the control computer and the interface, connected directly to the peripheral input device interface of the mobile computer to transmit manipulation data of the peripheral input device to the mobile computer from the control computer, a router, which is connected by its interfaces to the local network of the mobile computer and any other computer network for routing screen broadcast data on the local network and through the corresponding proxy server to any other computer network, a proxy server for relaying mobile computer screen broadcast streams to the control computer on other networks, the first control computer, which is connected to the local network of the mobile computer, for receiving data broadcast of the mobile computer screen from the local network, followed by displaying this screen broadcast on the monitor of the first control computer, and transmitting manipulation data in IP format to the IP interface of the conversion gateway via a local network for manipulating the interface of the mobile computer's peripheral input devices the corresponding peripheral input devices of the first control computer, a second control computer, which is connected to any other computer network accessible from the local network of the mobile computer to receive mobile computer screen broadcast data from any other network, followed by displaying this screen broadcast on the monitor of the second control computer, and transmitting manipulation data in IP format to the IP interface of the conversion gateway through any other network to manipulate the interface of the mobile computer's peripheral input devices the corresponding input peripheral devices of the second control computer.

A presentation of the material necessary to understand the essence of the invention of this system will be presented below in the order of content of the claims.

In one aspect, the present invention includes a system that further includes a second control computer that is connected to a global computer network. That is, the managed mobile computer and the control computer can be connected via the Internet. Retransmission of mobile computer screen broadcast data from the local network to the control computer is carried out through the appropriate proxy server. And the manipulation data from the control computer arrives after appropriate routing from the Internet to the IP interface of the conversion gateway and then, after conversion, through a direct wired or wireless connection to the HID interface of the mobile computer.

In another aspect, the present invention includes a system that includes a conversion gateway and a proxy server implemented in the same device format (FIG. 8). That is, this device has one connection to the local network of the mobile computer, and a second connection to the HID interface of the mobile computer. The device functions simultaneously as a screen broadcast data relay and as a gateway for converting HID interface manipulation data from IP to HID. For example, you can add these functions to the functionality of any "standard" network devices: routers, wireless routers, computers, gateways for IoT devices, smartphones, smart speakers, etc. It is also possible to use compact devices based on microcomputers.

In another aspect, the present invention includes a system that includes suitable interfaces of any type for mobile computer input peripherals and a conversion gateway. That is, the mobile computer interacts with the conversion gateway directly through a connection pre-established by the user between similar wired or wireless interfaces. For example, USB or Bluetooth.

One embodiment of this aspect includes a system that includes interfaces for HID mobile computer input peripherals and a conversion gateway. That is, mobile computers can use not only peripheral input device protocols with individual profiles and drivers, but also universal HID protocols to manipulate the input interface. Thus, in this case, the gateway converts manipulation data from IP to HID protocols.

In a further aspect, the present invention includes a system that includes suitable IP interfaces of any type for connecting a mobile computer to a network. That is, a mobile computer can be connected to a local network using both wireless (for example, Wi-Fi) and wired (for example, Ethernet) interfaces to broadcast the screen on a local or global network.

In yet another aspect, the present invention includes a system that includes input interfaces of a first and second control computer equipped with at least one peripheral device of a keyboard and a pointing device. That is, it is assumed that the user interface of the mobile computer is accessed using at least one peripheral input device of the first or second control computer, such as a keyboard or a computer mouse. In addition, the simultaneous use of these and other peripheral input devices is assumed.

As an embodiment of the technical result of the method and system described above, a device is claimed for accessing the user interface of a mobile computer from a control computer, implemented on the basis of a smartphone.

The technical problem to which the claimed invention is aimed can be formulated as the development of a new smartphone functionality for accessing the user interface of a managed mobile computer from the managing computer using the built-in functions of the managed mobile computer.

The technical result is that the mobile computer adequately responds to manipulation of the HID interface of the mobile computer by the peripheral input devices of the control computer, and is achieved through the use in several aspects of an appropriately configured smartphone to access the user interface of the mobile computer (FIG. 9) which includes:

wireless Wi-Fi interface of a smartphone connected to the local network of a mobile computer for receiving on the local network and transmitting to any other computer network data from broadcasting the mobile computer screen to the control computer, and receiving IP data for manipulating the interface of peripheral input devices of the mobile computer from the control computer;

a proxy server function for relaying mobile computer screen broadcast streams to the control computer to other networks;

a gateway function for converting IP manipulation data received from the control computer into an appropriate format for an input peripheral interface of the mobile computer, which includes an IP interface connected to a computer network for receiving IP manipulation data in IP format from the control computer and Bluetooth HID interface connected directly to the Bluetooth interface of the mobile computer input peripheral devices to transmit the manipulation data of the input peripheral device to the mobile computer from the control computer;

Bluetooth HID interface of a smartphone for direct connection with the same type of mobile computer interface with subsequent transmission of manipulation data from the control computer to the HID Bluetooth interface of the mobile computer after appropriate conversion of the IP to the Bluetooth HID protocol of the mobile computer interface;

in this case, a device for accessing the user interface of a mobile computer implemented on the basis of a smartphone functions simultaneously as a proxy server for relaying broadcast data of the mobile computer screen to the control computer in any other networks and as a gateway for converting manipulation data of the Bluetooth HID interface of the mobile computer from protocols IP in HID from the control computer.

A summary of the material necessary to understand the essence of the embodiment of the invention, implemented on the basis of a suitably configured smartphone, is presented below in the order of content of the claims.

One aspect of the invention includes an implementation of a device for accessing a user interface of a mobile computer based on any type of computer. It is obvious that the necessary functionality can be implemented on the basis of a computer of any type with appropriate interfaces and software (FIG. 9).

One embodiment of this aspect of the invention includes an implementation of a device for accessing a user interface comprising suitable interfaces of any type. That is, the access device can use: for connecting to the local network of a mobile computer, both a wired Ethernet interface and a wireless Wi-Fi interface; and for direct connection to the interface of peripheral input devices of a mobile computer, both a wired USB interface and a wireless Bluetooth interface.

In some embodiments, an access device to a user interface of a mobile computer configured as a smartphone includes: a wireless Wi-Fi interface of the smartphone connected to a local network of the mobile computer and configured for: reception in a local network and transmission to any other computer network of screen broadcast data of the mobile computer to a controlling computer, and reception of IP of data of manipulation by the interface of peripheral input devices of the mobile computer from the controlling computer; function a proxy server for relaying of screen broadcast streams of the mobile computer to the controlling computer over other networks; and function a gateway for converting of IP data of manipulation arriving from the controlling computer into a format compatible for the interface of the peripheral input devices of the mobile computer containing an IP interface connected to a computer network for obtaining the data of manipulation of the peripheral input device in IP format from the controlling computer and a Bluetooth HID interface, connected directly to a Bluetooth interface of the peripheral input devices of the mobile computer for transmission of manipulation data of the peripheral input device to the mobile computer from the controlling computer; and a Bluetooth HID interface of the smartphone for direct connection with the Bluetooth HID interface of the mobile computer with a subsequent transfer to the HID Bluetooth interface of the mobile computer of the data of manipulation from the controlling computer after conversion of IP into Bluetooth HID protocol of the interface of the mobile computer; and wherein the access device to the user interface of the smartphone simultaneously functions as the proxy server configured to relay screen broadcast data of the mobile computer to the controlling computer in any other networks and as conversion gateway for converting the manipulation data of Bluetooth HID interface of the mobile computer from IP to HID from the controlling computer.

The next several embodiments of this aspect contain implementations of additional functionality of "network" devices in terms of relaying mobile computer screen broadcast data and converting mobile computer HID interface manipulation data. For example, you can supplement with these functions the functionality of any "standard" network devices: routers, wireless routers, gateways for IoT devices, etc. (FIG. 9).

Several more variants of this aspect contain the implementation of additional functionality of computers and servers that are operated directly by private and corporate users, in terms of relaying mobile computer screen broadcast data and converting data for manipulating the HID interface of a mobile computer. For example, you can add these functions to the functionality of microcomputers, mobile computers, desktop computers, smart speakers, etc. (FIG. 9).

It has already been noted above that the presented inventions are applicable to computers of any type, but to a greater extent they are relevant for computers with mobile operating systems (for example, iOS or iPadOS), since the technologies existing in the previous level of technology are already applied to computers with other operating systems.

In addition, the technological advantages of the present invention make it possible to implement a service for accessing the user interface of almost any mobile device without using corresponding third-party mobile applications. Accordingly, the presented new technology can be used to develop application solutions absolutely within the framework of the security policy of mobile operating systems without installing additional functions directly on the mobile computer.

BRIEF DESCRIPTION OF THE DRAWINGS

The accompanying drawings included herein illustrate several aspects of the invention with their respective embodiments by way of accessing a user interface of a mobile computer in a smartphone format and, together with the description, serve to explain the principles of the invention for any type of computer.

DETAILED DESCRIPTION OF THE INVENTION

The following material contains detailed descriptions and drawings of various exemplary implementations in accordance with aspects and embodiments of the claimed invention to provide a fuller understanding of the relevant technical results to those skilled in the art. The following detailed description does not limit the invention, the scope of which is defined by the claims.

Aspects and embodiments of the present inventions provide a method, system, and apparatus for accessing a user interface of a mobile computer.

Figure 1:
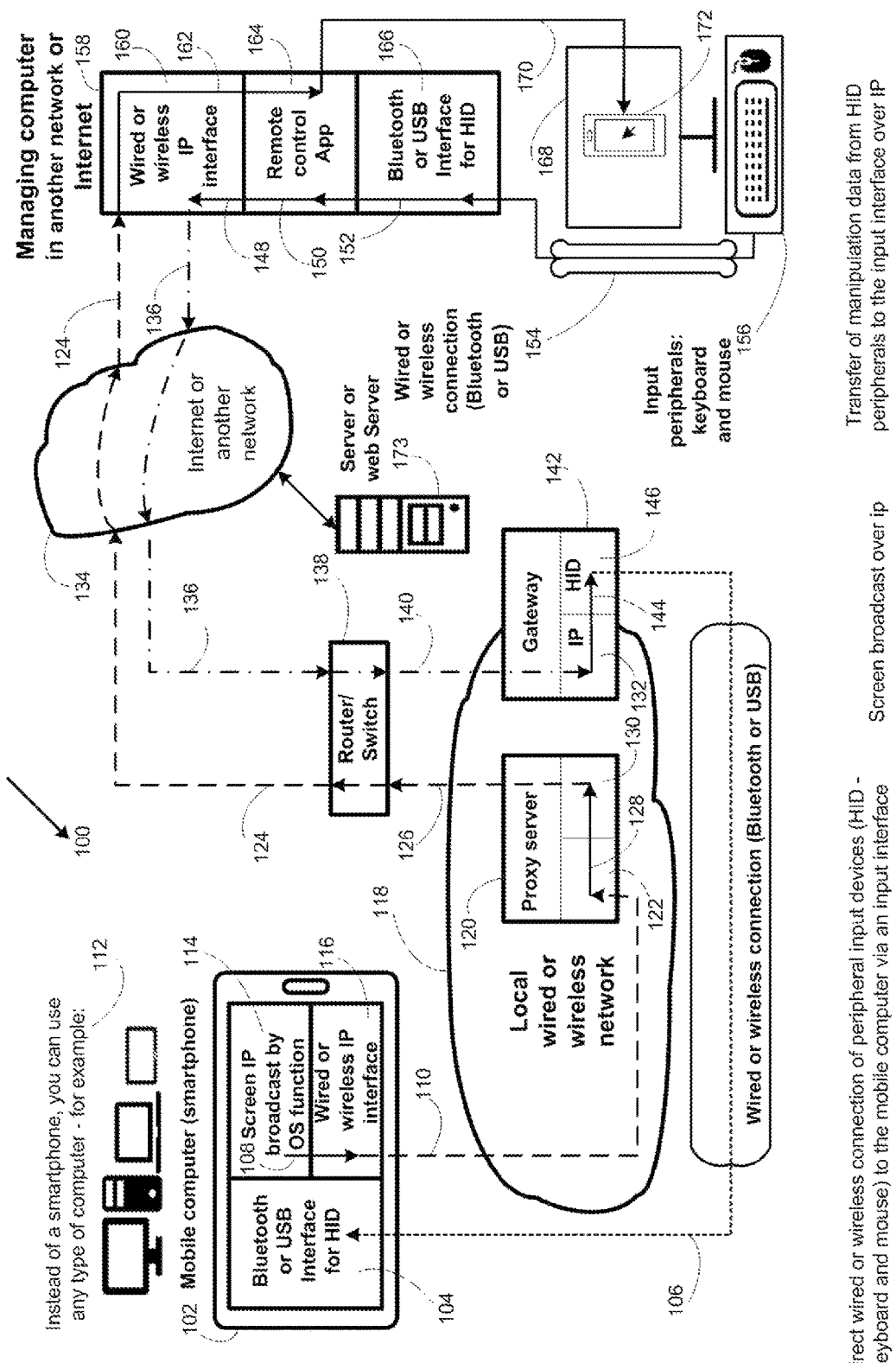
FIG. 1 illustrates the general principles of a method for accessing the user interface of a mobile computer from a control computer that is connected to a network other than the local network of the mobile computer.

FIG. 1 illustrates the general principles of the method of accessing the user interface of a mobile computer (smartphone) 102 from a control computer 158, which is connected to any other network 134 other than the local network 118 of the mobile computer (smartphone) 102, including through a global network 134.

The claimed invention is illustrated in FIG. 1 can be applied to any type of computer 112. Since the application of the present invention is most relevant to mobile computers, FIG. 1 and other drawings, a controllable mobile computer will be illustrated as an example in the format of a smartphone 102.

The smartphone 102 has one IP connection via the IP interface 116 with the IP interface 122 of the proxy server 120 via a local wired or wireless network 118 via channel 110, a second direct wired or wireless interface connection 106 for the HID 104 of the smartphone 102 with the corresponding interface 146 conversion gateway 142. The IP interface 130 of the proxy server 120 via channels 126 and 124 through the router 138 and the global or any other network 134 is connected to the IP interface 160 of the control computer 158. In turn, the IP interface 132 of the conversion gateway 142 via channels 140 and 136 via the router 138 and the global or any other network 134 are also connected to the wired or wireless IP interface 160 of the control computer 158. All IP interfaces of the proxy server 120 and the conversion gateway 142 are connected to the local network 118 of the smartphone 102.

Thus, the control computer 158, via an IP network, receives broadcast streams of the screen of the smartphone 172 to the monitor 168 and transmits manipulation data of the input devices 156 for the corresponding interface 104 of the smartphone 102. It will be understood that these information flows can be coordinated through a server or web server 173. In this case, the functions of the application 164 can be performed by a regular web browser. This option does not affect the essence of the invention and for a more intelligible presentation of the material will not be discussed below. A more detailed description of the interaction of the control computer 158 with the user interface of the smartphone 102 is presented below.

The user of the smartphone 102 activates, by means of the user interface and the built-in function of the operating system 114, the broadcast of the screen via channel 108 through the IP interface 116 of the smartphone 102 to the corresponding interface 122 of the proxy server 120 via channel 110. For example, in the case of an iOS smartphone, technology can be used AirPlay, and in the case of an Android smartphone, Chromecast technology can be used. Next, the proxy server 120 in transaction 128 through interface 130 relays the screen broadcast traffic of the smartphone 102 via channels 126 and 124 through the router 138 and network 134 to the IP interface 160 of the control computer 158. Then, through channel 162, the screen broadcast data is sent to the corresponding application 164 for the remote control of the smartphone 102. Application 164 processes the broadcast data of the screen of the smartphone 102 and then, via channel 170, displays the projection of the screen 172 of the smartphone 102 on the monitor 168.

Next, the user of the smartphone 102 activates, through the user interface, a direct wired or wireless connection 106 of the input device interface 104 of the smartphone 102 to the corresponding interface 146 of the conversion gateway 142. For example, Bluetooth or USB interfaces may be used.

The user of the control computer 158 then views the projection of the screen 172 of the smartphone 102 on the monitor 168 using input devices 156 (for example, a keyboard and mouse), and manipulates the user interface 104 of the smartphone 102 as follows. The UI manipulation data of the smartphone 102 comes from input devices 156 via a wired or wireless connection (Bluetooth or USB) via channel 154 to the corresponding interface 166. Then, via channel 152, the UI manipulation data of the smartphone 102 is received by the remote access application 164, which transforms the manipulation data into the appropriate format for transmission over the IP network, and then sends them via channel 148 to the wired or wireless IP interface 160 of the computer 158. Then the UI manipulation data through interface 160, network 134 and router 138 are sent via channels 136 and 140 to the IP interface 132 of the conversion gateway 142.

Next, the conversion gateway 142 in transaction 144 converts the manipulation data from the IP format into the physical and logical protocol (Bluetooth or USB) of the input interface 104 of the smartphone 102 and transmits it through the interface for HID 146 over channel 106 to the corresponding interface 104 (Bluetooth or USB) smartphone 102. As a result, the smartphone 102 adequately responds to remote manipulation of the UI of the smartphone 102 by the corresponding peripheral input devices 156 of the control computer 158.

Figure 2:
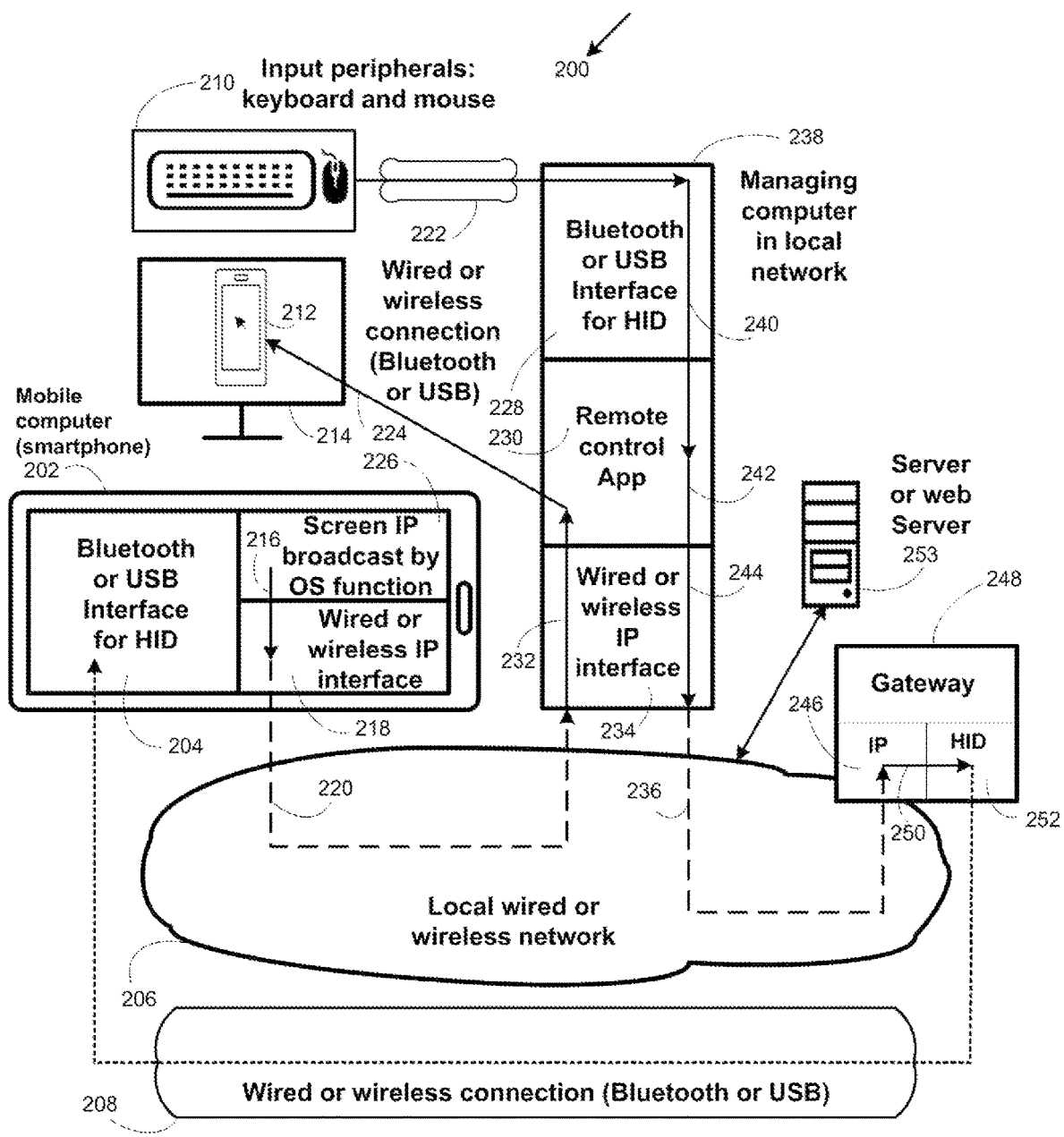
FIG. 2 illustrates a method for accessing the user interface of a mobile computer from a control computer on a local network.

FIG. 2 illustrates a method for accessing the user interface of a mobile computer (smartphone) 202 from a control computer 238 on a local network 206. That is, the managed mobile computer 202 and the control computer 238 are connected to the same local network 206.

The smartphone 202 has one IP connection 220 via the IP interface 218 with the IP interface 234 of the control computer 238 via a local wired or wireless network 206, a second direct wired or wireless interface connection 208 for the HID 204 of the smartphone 202 with the corresponding interface 252 of the conversion gateway 248.

In turn, the IP interface 246 of the conversion gateway 248 via channel 236 via the local network 206 is also connected to the wired or wireless IP interface 234 of the control computer 238. All IP interfaces of the control computer 238 and the conversion gateway 248 are connected to the local network 206 of the smartphone 202.

Thus, the control computer 238, through the local IP network 206, receives broadcast streams of the screen of the smartphone 212 to the monitor 214 and transmits input device manipulation data for the corresponding interface 204 of the smartphone 202. It will be understood that these information flows can be coordinated through a server or web server 253. In this case, the functions of the application 230 can be performed by a regular web browser. This option does not affect the essence of the invention and for a more intelligible presentation of the material will not be discussed below. A more detailed description of the interaction of the control computer 238 with the user interface of the smartphone 202 is presented below.

The user of the smartphone 202 activates, by means of the user interface and the built-in function of the operating system 226, the broadcast of the screen via channel 216 through the IP interface 218 and then via channel 220 to the corresponding interface 234 of the control computer 238. For example, in the case of an iOS smartphone, AirPlay technology can be used, and in the case of an Android smartphone, Chromecast technology can be used. Then, via channel 232, the screen broadcast data is sent to the corresponding application 230 for remote control of the smartphone 202. Application 230 processes the screen broadcast data of the smartphone 202 and then, via channel 224, displays the projection of the screen 212 of the smartphone 202 on the monitor 214.

Next, the user of the smartphone 202 activates, through the user interface, a direct wired or wireless connection of the interface for the input devices 204 of the smartphone 202 to the corresponding interface 252 of the conversion gateway 248. For example, Bluetooth or USB interfaces may be used.

The user of the control computer 238 then views the projection of the screen 212 of the smartphone 202 on the monitor 214 using input devices 210 (for example, a keyboard and mouse), and manipulates the user interface of the smartphone 202 as follows. The UI manipulation data of the smartphone 202 comes from input devices 210 via a wired or wireless connection (Bluetooth or USB) via channel 222 to the corresponding interface 228 of the control computer 238. Then, via channel 240, the UI manipulation data of the smartphone 202 is received by the remote access application 230, which transforms the manipulation data into the appropriate format for transmission over the IP network, and then sends them via channel 242 to the wired or wireless IP interface 234 of the computer 238. Then the UI manipulation data through the interface 234, network 206 is sent via channel 236 to the IP interface 246 of the conversion gateway 248.

Next, the conversion gateway 248 in transaction 250 converts the manipulation data from the IP format into the physical and logical protocol (Bluetooth or USB) of the input interface 204 of the smartphone 202 and transmits it through the interface for HID 252 via channel 208 to the corresponding interface 204 (Bluetooth or USB) smartphone 202. As a result, the smartphone 202 adequately responds to remote manipulation of the UI of the smartphone 202 by the corresponding peripheral input devices 210 of the control computer 238.

Figure 3:
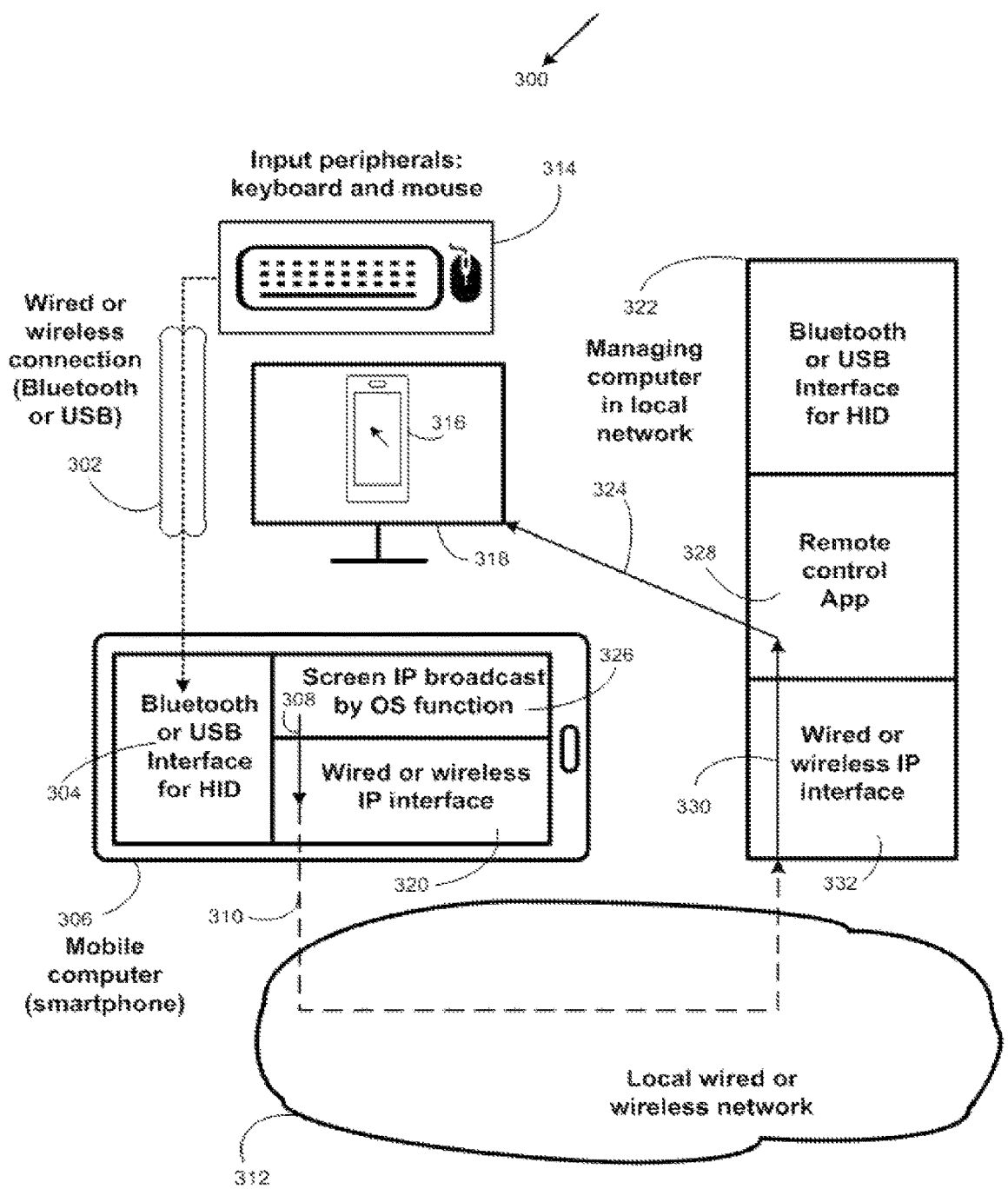
FIG. 3 illustrates a method for accessing the user interface of a mobile computer from a control computer, which contains a direct connection of the interface of peripheral input devices of the mobile computer with the interfaces of additional input devices that are used to access the user interface of the mobile computer together with broadcasting the screen of the mobile computer to the monitor of the control computer without participation conversion gateway.

FIG. 3 illustrates a method for accessing the user interface of a mobile computer (smartphone) 306 from a control computer 322, which contains a direct connection of the interface of peripheral input devices 304 of the mobile computer (smartphone) 306 with the interfaces of additional input devices 314 without the participation of a conversion gateway, which are used to access the user interface of the mobile computer together with the broadcast of the screen 316 of the mobile computer (smartphone) 306 to the monitor 318 of the control computer 322.

That is, the smartphone 306 and the control computer 322 are operated simultaneously and are physically accessible by the same user, and the input devices (such as mouse and keyboard) 314 are connected directly to the interface of the smartphone 306, which are manipulated by the user of the personal computer 322, simultaneously using the display 316 of the smartphone 306 on the monitor 318 of his personal computer 322 to manipulate the graphical interface of the smartphone 306. Thus, the user directly from his personal computer 322 has legal and secure access to control the user interface of his smartphone 306.

Preliminarily, the smartphone 306 has one IP connection 310 via an IP interface 320 to the IP interface 332 of the control computer 322 via a local wired or wireless network 312, a second direct wired or wireless interface connection 302 to the HID 304 of the smartphone 306 with associated input devices 314. IP The interfaces of the control computer 322 and the smartphone 306 are connected to the local network 312.

Thus, the control computer 322, through the local IP network 312, receives broadcast streams of the screen 316 of the smartphone 306 to the monitor 318.

The transfer of manipulation data occurs directly from user input devices 314, which are connected directly to the interface 304 of the smartphone 306. A more detailed description of the interaction of the control computer 322 with the user interface of the smartphone 306 is presented below.

The user of the smartphone 306 activates, through the user interface and the built-in function of the operating system 326, the broadcast of the screen via channel 308 through the IP interface 320 of the smartphone 306 to the corresponding interface 332 of the control computer 322 via channel 310. For example, in the case of an iOS smartphone, AirPlay technology can be used, and in the case of an Android smartphone, Chromecast technology can be used. Then, via channel 330, the screen broadcast data is sent to the corresponding application 328 for remote control of the smartphone 306. Application 328 processes the screen broadcast data of the smartphone 306 and then, via channel 324, displays the projection of the screen 316 of the smartphone 306 on the monitor 318.

Next, the user of the smartphone 306 enables, via the user interface, direct wired or wireless connection of the interface for input devices 304 of the smartphone 306 to the input devices 314. For example, Bluetooth or USB interfaces may be used.

The user of the control computer 322 then views the projection of the screen 316 of the smartphone 306 on the monitor 318, using input devices 314 (for example, a keyboard and mouse) to manipulate the user interface of the smartphone 306. Thus, the manipulation data of the UI of the smartphone 306 comes from input devices 314 through a wired or wireless connection (Bluetooth or USB) channel 302 to the interface 304 of the smartphone 306. As a result, the smartphone 306 adequately responds to the manipulation of the UI of the smartphone 306 by the corresponding peripheral input devices 314, which are controlled by the user of the computer 322.

Figure 4:
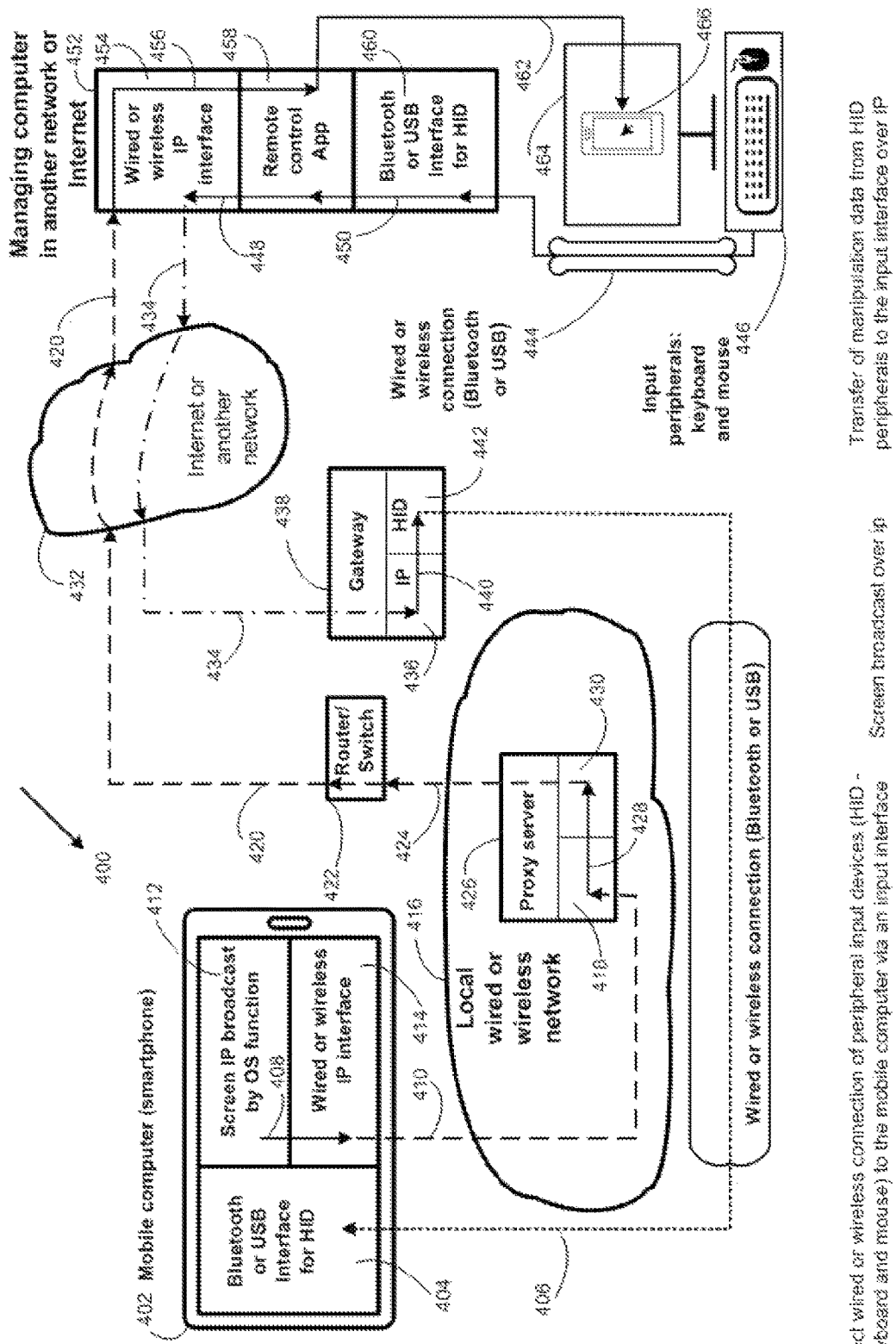
FIG. 4 illustrates a method for accessing the user interface of a mobile computer from a control computer, which includes connecting the IP interface of the conversion gateway to a network other than the local network of the mobile computer and directly connecting the interface of the input device of the conversion gateway to the corresponding interface of the mobile computer.

FIG. 4 illustrates a method for accessing the user interface of a mobile computer (smartphone) 402 from a control computer 452, which includes connecting the IP interface 436 of the conversion gateway 438 to a network 432 other than the local network 416 of the mobile computer (smartphone) 402 and a direct connection to the input device interface 442 of the conversion gateway 438 with the corresponding interface 404 of the mobile computer (smartphone) 402.

That is, in this case, the manipulation data, after appropriate routing, arrives at the IP interface 436 of the conversion gateway 438 from other networks 432 (including the Internet and other mobile networks). Once converted into transactions 440, this data is transferred from the interface to the HID 442 via a direct wired or wireless connection 406 to the HID interface 404 of the mobile computer (smartphone) 402.

The Previously, smartphone 402 has one IP connection 410 via IP interface 414 to IP interface 418 of proxy server 426 via local wired or wireless network 416 over channel 410, a second direct wired or wireless interface connection 406 to HID 404 of smartphone 402 with corresponding interface 442 conversion gateway 438. The IP interface 430 of the proxy server 426 via channels 424 and 420 through the router 422 and the global or any other network 432 is connected to the IP interface 454 of the control computer 452. In turn, the IP interface 436 of the conversion gateway 438 via channels 434 via the global or any other network 432 is also connected to the wired or wireless IP interface 454 of the control computer 452. The IP interfaces of the proxy server 426 are connected to the local network 416. The IP interface 436 of the conversion gateway 438 is connected to any other network 432, other than the network 416.

Thus, the control computer 452, via an IP network, receives broadcast streams of the screen of the smartphone 402 in the form of a projection of the screen 466 onto the monitor 464 and transmits manipulation data of the input devices 446 for the corresponding interface 404 of the smartphone 402. A more detailed description of the interaction of the control computer 452 with the user interface smartphone 402 is presented below.

The user of the smartphone 402 activates, through the user interface and a built-in function of the operating system 412, the screen broadcast via channel 408 through the IP interface 414 of the smartphone 402 to the corresponding interface 418 of the proxy server 426 via channel 410. For example, in the case of an iOS smartphone, technology can be used AirPlay, and in the case of an Android smartphone, Chromecast technology can be used. Next, the proxy server 426 in transaction 428 through interface 430 relays the screen broadcast traffic of the smartphone 402 via channels 424 and 420 through the router 422 and network 432 to the IP interface 454 of the control computer 452. Then, through channel 456, the screen broadcast data is sent to the corresponding application 458 for the remote control of the smartphone 402. The application 458 processes the screen broadcast data to display the screen of the smartphone 402 and then, via channel 462, displays the projection of the screen 466 of the smartphone 402 to the monitor 464.

The user of the smartphone 402 then activates, through the user interface, a direct wired or wireless connection of the smartphone input device interface 404 to the corresponding interface 442 of the conversion gateway 438. For example, Bluetooth or USB interfaces may be used.

The user of the control computer 452 then views the projection of the screen 466 of the smartphone 402 on the monitor 464 using input devices 446 (such as a keyboard and mouse), and manipulates the user interface of the smartphone 402 as follows. The UI manipulation data of the smartphone 402 comes from the input devices 446 through a wired or wireless connection (Bluetooth or USB) to the channel 444 to the corresponding interface 460. Next, through the channel 450, the UI manipulation data of the smartphone 402 is received by the remote access application 458, which transforms the manipulation data into the appropriate format for transmissions over the IP network, and then sends them via channel 448 to the wired or wireless IP interface 454 of the computer 452. Then the UI manipulation data via interface 454, network 432 is sent via channel 434 to the IP interface 436 of the conversion gateway 438.

Next, the conversion gateway 438 in transaction 440 converts the manipulation data from the IP format into the physical and logical protocol (Bluetooth or USB) of the input interface 404 of the smartphone 402 and transmits it through the interface for HID 442 over channel 406 to the corresponding interface 404 (Bluetooth or USB) smartphone 402. As a result, the smartphone 402 adequately responds to remote manipulation of the smartphone UI 402 by the corresponding input peripheral devices 446 of the control computer 452.

Figure 5:
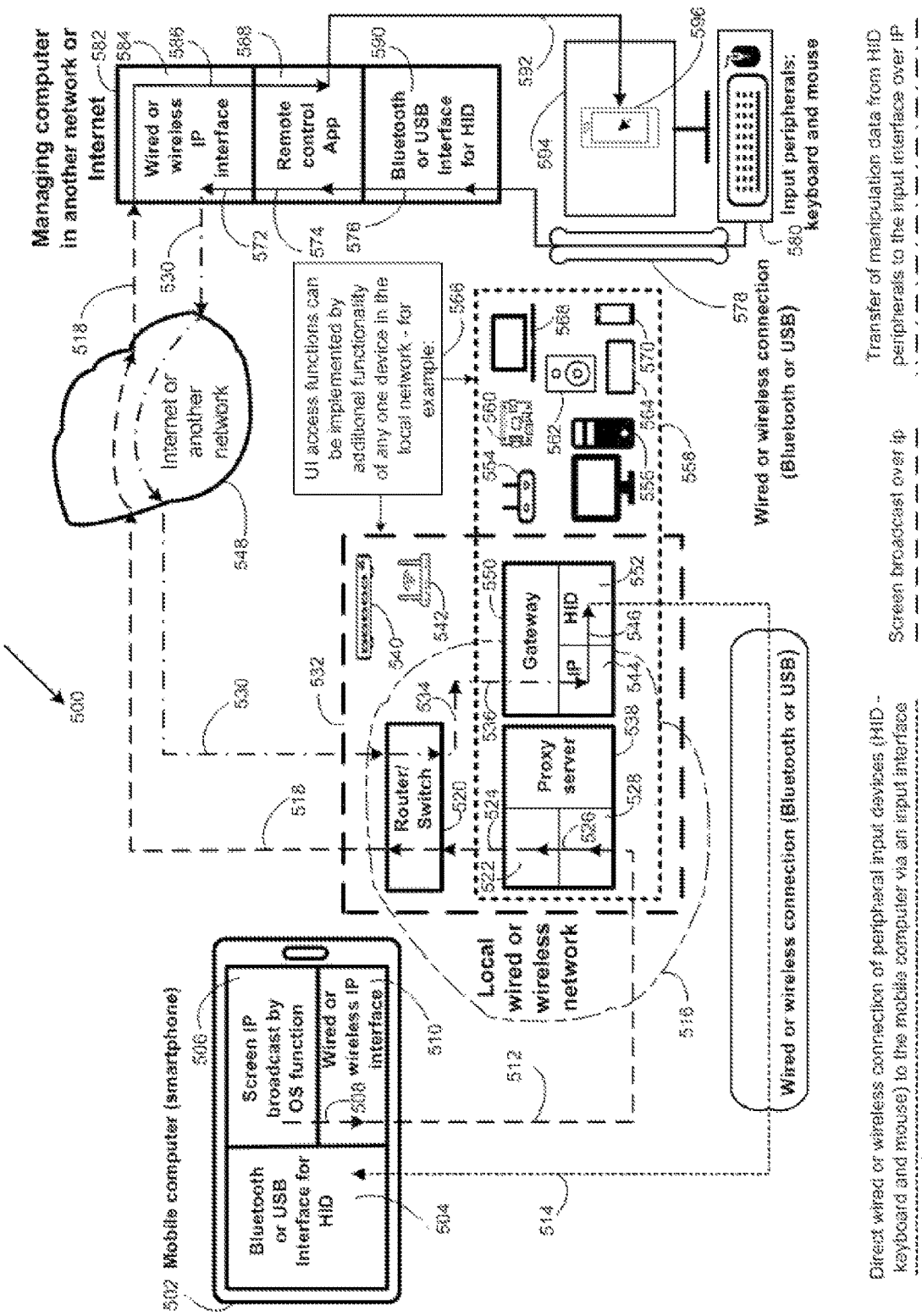
FIG. 5 illustrates a method for accessing the user interface of a mobile computer, which includes broadcasting the screen to the control computer and converting interface manipulation data from IP into the corresponding protocols for manipulating the interface of peripheral input devices of the mobile computer, implemented by the functionality of the same device connected to the local network of the mobile computer.

FIG. 5 illustrates a method for accessing the user interface of a mobile computer (smartphone) 502, which includes broadcasting the screen to the control computer 582 and converting interface manipulation data from IP into the corresponding protocols for manipulating the interface of peripheral input devices 504 of the mobile computer (smartphone) 502, implemented by the functionality of one and the same the same device 566 connected to the local network 516 of the mobile computer (smartphone) 502. That is, you can use almost any device 566 connected to the local network 516, containing the functions of relaying mobile computer screen broadcast data and converting IP protocols of manipulation data coming to the HID interface mobile computer (smartphone) 502.

This device 566 has one IP connection 512 to the local network 516, and a second connection 514 to the HID interface 504 of the mobile computer (smartphone) 502. The device functions simultaneously as a relay (proxy server 538) of screen broadcast data and as a gateway for conversion 550 HID 504 interface manipulation data from IP to HID protocols. For example, these functions can complement the functionality of any "standard" network devices: routers 540, wireless routers 542, computers 556, gateway for IoT devices 554, smartphones 570, smart speakers 562, laptops 568, tablets 564, etc. So It is also possible to use compact devices based on a 560 microcomputer, for example, in the IoT device format.

In the following, the proxy server 538 and the conversion gateway 550 appear as an additional function of the device 566, which can be implemented in the format of any device connected to the local network 516.

The smartphone 502 has one IP connection 512 via the IP interface 510 with a proxy server 538 via a local wired or wireless network 516 via channel 512, a second direct wired or wireless interface connection 514 for the HID 504 of the smartphone 502 with a corresponding conversion gateway 550 interface 552. The IP interface 522 of the proxy server 538 via channels 524 and 518 through the router 520 and the global or any other network 548 is connected to the IP interface 584 of the control computer 582. In turn, the IP interface 544 of the conversion gateway 550 via channels 534, 536 and 530 via the router 520 and the global or any other network 548 are also connected to the wired or wireless IP interface 584 of the control computer 582. All IP interfaces of the proxy server 538 and the conversion gateway 550 are connected to the local network 516 of the smartphone 502.

Thus, the control computer 582, via an IP network, receives broadcast streams of the screen of the smartphone 596 to the monitor 594 and transmits manipulation data of the input devices 580 to the corresponding interface 504 of the smartphone 502. A more detailed description of the interaction of the control computer 582 with the user interface of the smartphone 502 is presented below.

The user of the smartphone 502 activates, through the user interface and the built-in function of the operating system 506, the broadcast of the screen via channel 508 through the IP interface 510 of the smartphone 502 to the corresponding interface 528 of the proxy server 538 via channel 512. For example, in the case of an iOS smartphone, technology can be used AirPlay, and in the case of an Android smartphone, Chromecast technology can be used. Next, the proxy server 538 in transaction 526 through interface 522 relays the screen broadcast traffic of the smartphone 502 via channels 524 and 518 through the router 520 and network 548 to the IP interface 584 of the control computer 582. Then, through channel 586, the screen broadcast data is sent to the corresponding application 588 for the remote control of the smartphone 502. The application 588 processes the screen broadcast data to display the screen of the smartphone 502 and then, via channel 592, displays the projection of the screen 596 of the smartphone 502 to the monitor 594.

The user of the smartphone 502 then activates, through the user interface, a direct wired or wireless connection 514 of the input device interface 504 of the smartphone 502 to the corresponding interface 552 of the conversion gateway 550. For example, Bluetooth or USB interfaces may be used.

The user of the control computer 582 then views the projection of the screen 596 of the smartphone 502 on the monitor 594 using input devices 580 (eg, a keyboard and mouse), and manipulates the user interface 504 of the smartphone 502 as follows. The UI manipulation data of the smartphone 502 comes from the input devices 580 through a wired or wireless connection (Bluetooth or USB) to the channel 578 to the corresponding interface 590. Then, via channel 576, the UI manipulation data of the smartphone 502 is received by the remote access application 588, which transforms the manipulation data into the appropriate format for transmissions over the IP network, and then sends them via channel 574 to the wired or wireless IP interface 584 of the computer 582. Then the UI manipulation data through interface 584, network 548 and router 520 are sent via channels 530, 534 and 536 to the IP interface 544 of the conversion gateway 550.

Next, the conversion gateway 550 in transaction 546 converts the manipulation data from the IP format into the physical and logical protocol (Bluetooth or USB) of the input interface 504 of the smartphone 502 and transmits it through the interface for HID 552 over channel 514 to the corresponding interface 504 (Bluetooth or USB) smartphone 502. As a result, the smartphone 502 adequately responds to remote manipulation of the smartphone UI 502 by the corresponding input peripheral devices 580 of the control computer 582.

Figure 6:
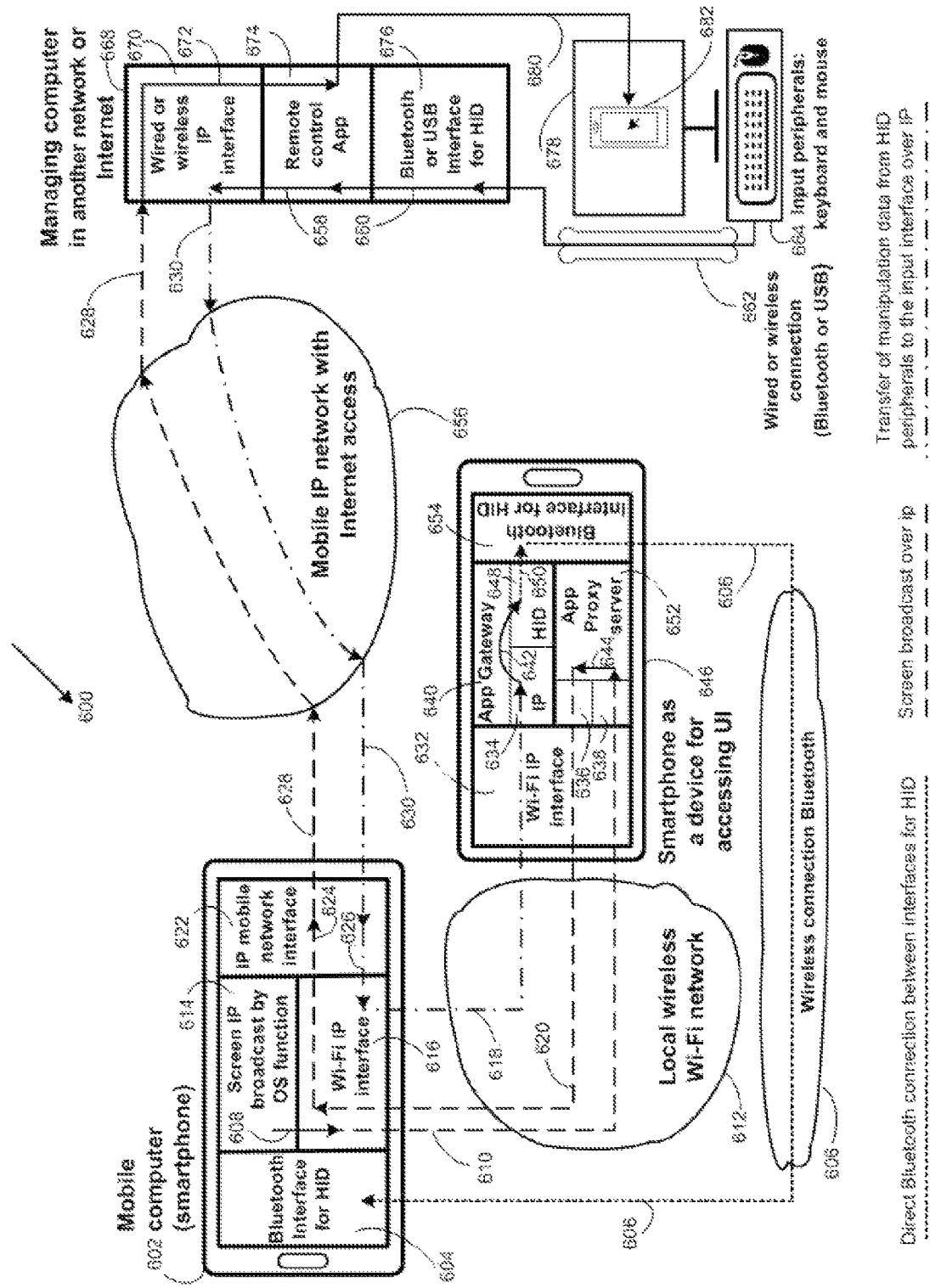
FIG. 6 illustrates a method for accessing a user interface of a mobile computer, which includes broadcasting the screen and receiving IP interface manipulation data through a mobile IP network to which the mobile computer is connected.

FIG. 6 illustrates a method for accessing the user interface of a mobile computer (smartphone) 602 to interact with a control computer 668, which includes broadcasting a screen 614 and receiving manipulation data by the IP interface 622 of a mobile computer (smartphone) 602 via a mobile IP network with Internet access 656, to which mobile computer (smartphone) 602 is connected.

That is, the user interface is accessed via a mobile IP network quickly anywhere and at any time at the user's request. The corresponding functions of screen relay (proxy server application 652) and conversion of manipulation data from IP to HID (conversion gateway application 640) can be performed, for example, on a specially configured mobile device (for example, smartphone 646), which is located in the same local Wi-Fi-Fi network 612 with a mobile computer (smartphone) 602. Access to the local Wi-Fi network 612 is carried out through a wireless access point 616 activated on the mobile computer (smartphone) 602.

The proxy server application 652 and the conversion gateway application 640 are additional functions of the access device (smartphone 646), which can be implemented in the format of any device connected to the local network 612, and are hereinafter referred to as the proxy server 652 and gateway conversion 640.

The smartphone 602 has one IP connection via IP interfaces 616 and 632 with a proxy server 652 via local wireless network 612 via channels 610 (via IP interface 638) and 620 (via IP interface 636), a second IP connection 618 via IP interface 616 to conversion gateway 640 via local wireless network 612 (via IP interface 632), and another direct wireless connection 606 interface for HID 604 (Bluetooth) smartphone 602 to conversion gateway 640 (interface 648) via corresponding smartphone interface 654 (Bluetooth) 646.

In addition, the IP interface 636 of the proxy server 652 via channels 620, 624 and 628 via the Wi-Fi IP interface 616 and the IP interface of the mobile network 622, the mobile IP network with Internet access 656 is connected to a wired or wireless IP interface 670 control computer 668.

In turn, the IP interface 634 of the conversion gateway 640 via channels 618, 626 and 630 via the Wi-Fi IP interface 616 and the IP interface of the mobile network 622, the mobile IP network with Internet access 656 is also connected to a wired or wireless IP interface 670 control computer 668.

Thus, the control computer 668, via an IP network, receives broadcast streams of the screen 682 of the smartphone 602 to the monitor 678 and transmits manipulation data of the input devices 664 for the corresponding interface 604 of the smartphone 602. A more detailed description of the interaction of the control computer 668 with the user interface of the smartphone 602 is presented below.

The user of the smartphone 602 activates, through the user interface and the built-in function of the operating system 614, the screen broadcast via channel 610 through the IP interface 616 of the smartphone 602 to the corresponding interface 638 of the proxy server 652 through the IP interface 632 of the smartphone 646. For example, in the case of an iOS smartphone, the AirPlay technology can be used, and in the case of an Android smartphone, Chromecast technology can be used. Next, the proxy server 652 in transaction 644 through interface 636 relays the screen broadcast traffic of the smartphone 602 via channels 620, 624 and 628 via Wi-Fi IP interfaces 632 and 616, IP interface of the mobile network 622, mobile IP network with Internet access 656 to the IP interface 670 of the control computer 668. Then, via channel 672, screen broadcast data is sent to the corresponding application 674 for remote control of the smartphone 602. Application 674 processes the screen broadcast data to display the screen of the smartphone 602 and then, via channel 680, displays the projection of the screen 682 of the smartphone 602 on the screen monitor 678.

Next, the user of the smartphone 602 activates, via the user interface, a direct wireless connection between the Bluetooth interface 604 for the input devices of the smartphone 602 and the corresponding interface 648 of the conversion gateway 640 via the Bluetooth interface 654 of the smartphone 646.

The user of the control computer 668 then views the projection of the screen 682 of the smartphone 602 on the monitor 678 using input devices 664 (eg, a keyboard and mouse), and manipulates the user interface of the smartphone 602 as follows. The UI manipulation data of the smartphone 602 comes from the input devices 664 through a wired or wireless connection (Bluetooth or USB) to the channel 662 to the corresponding interface 676. Next, through the channel 660, the UI manipulation data of the smartphone 602 is received by the remote access application 674, which transforms the manipulation data into the appropriate format for transmissions over the IP network, and then sends them via channel 658 to the wired or wireless IP interface 670 of the computer 668. Then the UI manipulation data via interface 670 and network 656 is sent via channels 630, 626 and 618 via IP interfaces 622 of the mobile network and 616, 632 Wi-Fi networks 612 to IP interface 634 conversion gateway 640.

Next, the conversion gateway 640 in transaction 642 converts the manipulation data from the IP format into the physical and logical protocol (Bluetooth) of the input interface 604 of the smartphone 602 and transmits it through the interface for HID 648 and Bluetooth interface 654 over channels 650 and 606 to the corresponding Bluetooth interface 604 smartphone 602. As a result, the smartphone 602 adequately responds to remote manipulation of the smartphone UI 602 by the corresponding input peripheral devices 664 of the control computer 668.

Figure 7:
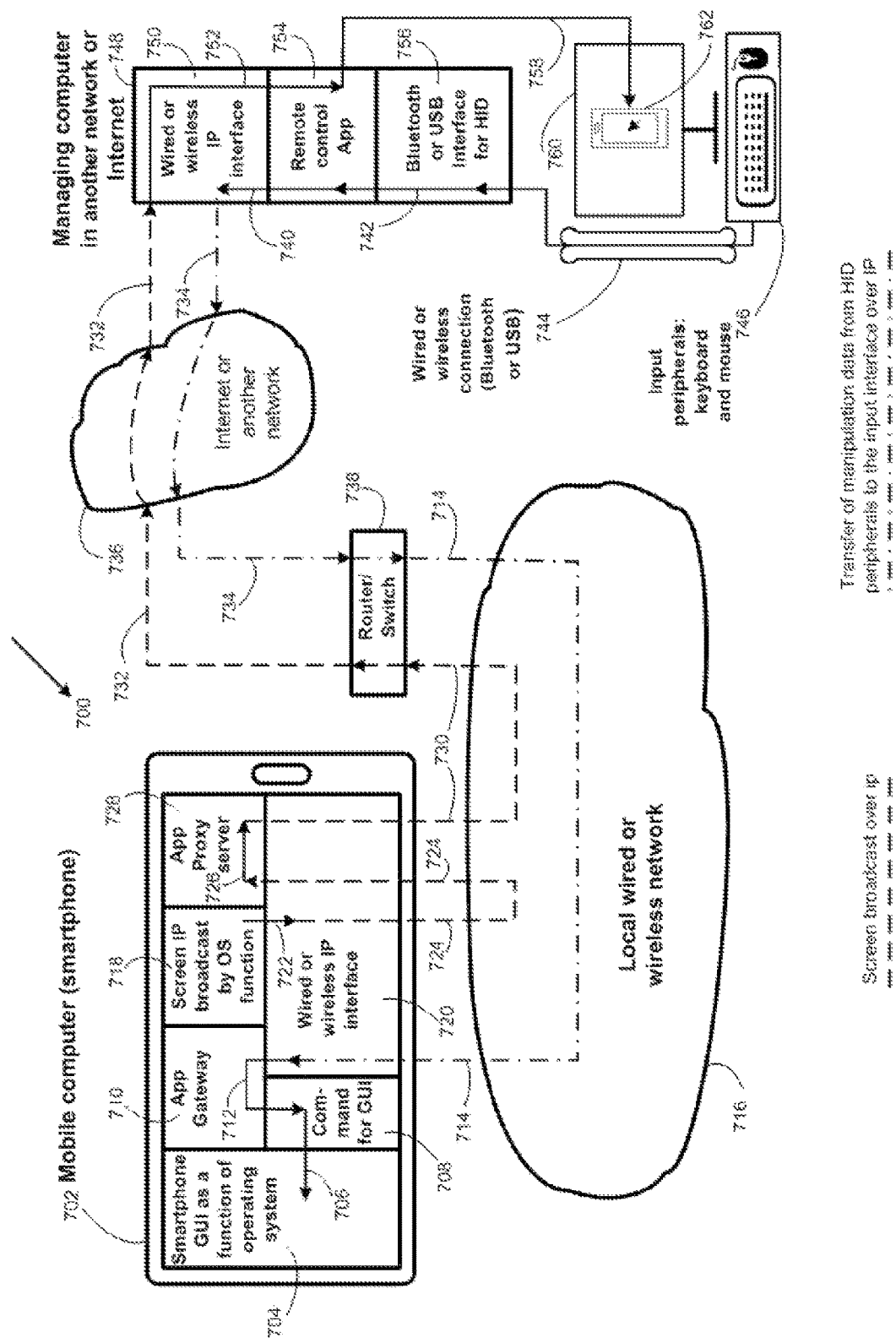
FIG. 7 illustrates a method for accessing the user interface of a mobile computer, which includes broadcasting the screen and converting interface manipulation data from IP into control commands for the user interface of the mobile computer, implemented by the functionality of third-party applications installed on the mobile computer.

FIG. 7 illustrates a method for accessing the user interface of a mobile computer (smartphone) 702, which includes broadcasting the screen 718 and converting interface manipulation data from IP into control commands for the user interface 708 of the mobile computer (smartphone) 702, implemented by the functionality of third-party applications 728 and 710, respectively, installed on mobile computer (smartphone) 702, to interact with the control computer 748 via networks 716 and 736.

That is, users are in principle able to use not only the "out-of-the-box" functionality of the mobile computer user interface, but also third-party applications (for example, 728 with proxy functionality) developed based on the operating system's screen broadcasting functionality 718. In addition, it is possible to develop and install a third-party application (for example, 710 with conversion gateway functionality), which converts commands in IP format from the remote control computer 748 into control commands for the graphical interface 708 of the mobile computer (smartphone) 702 using the functions of the operating system without use of logical and hardware resources of the network and third-party equipment. For example, you can use the appropriate accessibility options of the Android operating system (Switch Access).

Preliminarily, the smartphone 702 has the following IP connections through a wired or wireless IP interface 720 and a local wired or wireless network 716. One IP connection of a proxy server application 728 on channels 724, 730 and 732 through a router 738 and other networks or the Internet 736 to the wired or wireless IP interface 750 of the control computer 748 to broadcast the screen 718. A second IP connection of the conversion gateway application 710 via channel 714 to receive manipulation data from the user interface of the smartphone 702 through the router 738 via channel 734 from other networks or the Internet 736 from the wired or wireless IP interface 750 control computer 748.

Thus, the control computer 748, via an IP network, receives broadcast streams of the screen 762 of the smartphone 702 to the monitor 760 and transmits manipulation data of the input devices 746 for the corresponding user interface of the smartphone 702. A more detailed description of the interaction of the control computer 748 with the user interface of the smartphone 702 is presented below.

The user of the smartphone 702 activates, through the user interface and a built-in function of the operating system 718, the screen broadcast via channel 722 through the IP interface 720 of the smartphone 702 to the proxy server application 728 installed on the smartphone 702, via channels 724 through the network 716. For example, in the case An iOS smartphone can use AirPlay technology, and an Android smartphone can use Chromecast technology.

Then, the proxy server application 728 in transaction 726 relays the screen broadcast traffic of the smartphone 702 through the network 716 and interface 720 on channels 730 to the router 738 and then on channels 732 through the network 736 to the IP interface 750 of the control computer 748. Further along the channel 752, the screen broadcast data is supplied to the corresponding application 754 for remote control of the smartphone 702. The application 754 processes the screen broadcast data to display the screen of the smartphone 702 and then, via channel 758, displays the projection of the screen 762 of the smartphone 702 on the monitor 760.

The user of the control computer 748 then views the projection of the screen 762 of the smartphone 702 on the monitor 760 using input devices 746 (eg, a keyboard and mouse), and manipulates the user interface of the smartphone 702 as follows. The UI manipulation data of the smartphone 702 comes from the input devices 746 through a wired or wireless connection (Bluetooth or USB) to the channel 744 to the corresponding interface 756. Next, through the channel 742, the UI manipulation data of the smartphone 702 is received by the remote access application 754, which transforms the manipulation data into the appropriate format for transmissions over the IP network, and then sends them via channel 740 to the wired or wireless IP interface 750 of computer 748. Then the UI manipulation data via interface 750, network 736 and router 738 are sent via channels 734, 714 via network 716 and IP interface 720 to the application 710 conversion gateway.

Next, the conversion gateway application 710 in transaction 712 converts the manipulation data from the IP format into control commands for the user interface 708 of the mobile computer (smartphone) 702, which are transmitted via channel 706 for execution to the corresponding operating system functions for the user interface of the smartphone 702. As a result, the smartphone 702 adequately responds to remote manipulation of the smartphone UI 702 by the corresponding peripheral input devices 746 of the control computer 748.

Figure 8:
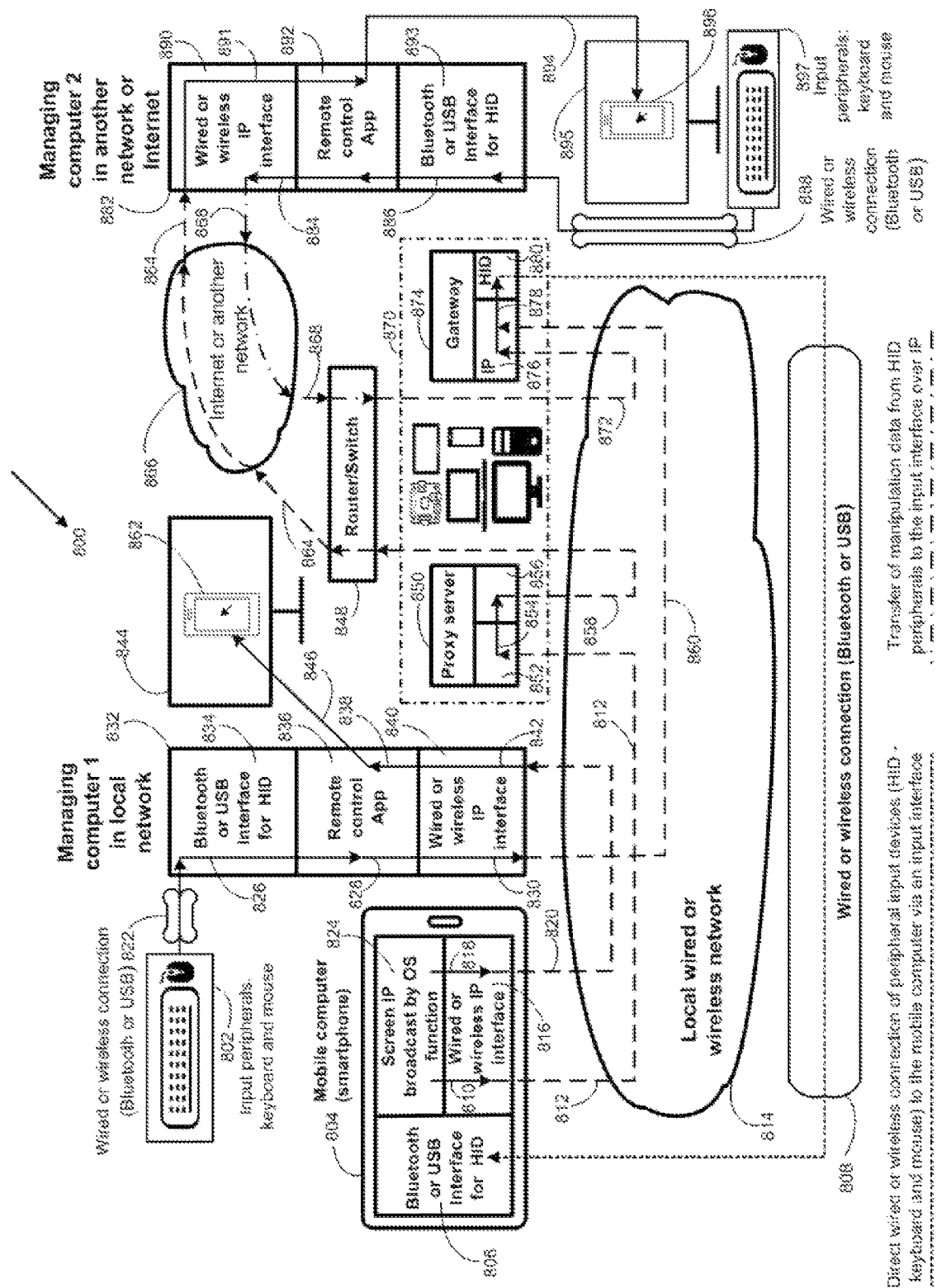
FIG. 8 is a simplified block diagram that illustrates an exemplary representation of a mobile computer user interface access system with relevant components.

FIG. 8 is a simplified block diagram that illustrates an exemplary representation of a system for accessing the user interface of a mobile computer (smartphone) 804 from both a local network and other networks or the Internet, with relevant components to best illustrate the invention.

System according to FIG. 8 contains the following main components: a mobile computer in the format of a smartphone 804, a first control computer 832 connected to a local network 814, a second control computer 882 connected to another computer network 866 accessible from the local network 814, a gateway 874 for converting IP protocols of the smartphone UI manipulation data 804, a proxy server 850 for relaying broadcast streams of the smartphone screen 804 to the second control computer 882 to other networks 866, a router 848 connected to the local network 814 and any other computer network 866. The IP interfaces of any system components can be wired or wireless. The system components contain suitable IP interfaces of any type for connecting to an IP network.

System according to FIG. 8 implements access to the user interface of the smartphone 804 from the first control computer 832 connected to the local network 814, and the second control computer 882 connected to another computer network 866 accessible from the local network 814. Thus, both options for accessing the smartphone UI will be discussed below 804: from local network 814 and from any other network or Internet 866.

To access the UI of the smartphone 804 from the local network 814, the system components are pre-connected as follows. Smartphone 804 has one IP connection 820 via IP interface 816 to IP interface 840 of control computer 832 via local wired or wireless network 814, a second direct wired or wireless interface connection 808 to the HID 806 of smartphone 804 to the corresponding interface 880 of conversion gateway 874.

Thus, the control computer 832, through the local IP network 814, receives broadcast streams of the screen 862 of the smartphone 804 to the monitor 844 and transmits manipulation data of the input devices 802 for the corresponding interface 806 of the smartphone 804. A more detailed description of the interaction of the control computer 832 with the user interface of the smartphone 806 presented below.

The user of the smartphone 804 activates, through the user interface and the built-in function of the operating system 824, the broadcast of the screen via channel 818 to the IP interface 816 and then via channel 820 to the corresponding interface 840 of the control computer 832. For example, in the case of an iOS smartphone, AirPlay technology can be used, and in the case of an Android smartphone, Chromecast technology can be used. Then, via channel 842, the screen broadcast data is sent to the corresponding application 836 for remote control of the smartphone 804. Application 836 processes the screen broadcast data to display the screen of the smartphone 804 and then, via channel 846, displays the projection of the screen 862 of the smartphone 804 on the monitor 844.

Next, the user of the smartphone 804 activates, through the user interface, a direct wired or wireless connection of the input device interface 806 of the smartphone 804 to the corresponding interface 880 of the conversion gateway 874. The interfaces 806 and 880 to be connected can be any type of interface. For example, Bluetooth or USB interfaces can be used, including using the HID protocol.

The user of the control computer 832 then views the projection of the screen 862 of the smartphone 804 on the monitor 844 using input devices 802 (eg, a keyboard and mouse), and manipulates the user interface of the smartphone 804 as follows. The UI manipulation data of the smartphone 804 comes from the input devices 802 through a wired or wireless connection (Bluetooth or USB) channel 822 to the corresponding interface 834 of the control computer 832. Next, through the channel 826, the UI manipulation data of the smartphone 804 is received by the remote access application 836, which transforms the manipulation data into the appropriate format for transmission over the IP network, and then sends them via channel 830 to the wired or wireless IP interface 840 of the computer 832. Then the UI manipulation data through the interface 840, network 814 is sent via channel 860 to the IP interface 876 of the conversion gateway 874.

Next, the conversion gateway 874 in transaction 878 converts the manipulation data from the IP format into the physical and logical protocol (Bluetooth or USB) of the input interface 806 of the smartphone 804 and transmits it through the interface for HID 880 over channel 808 to the corresponding interface 806 (Bluetooth or USB) smartphone 804. As a result, the smartphone 804 adequately responds to remote manipulation of the smartphone UI 804 by the corresponding input peripheral devices 802 of the control computer 832.

To access the smartphone UI 804 from any other network or Internet 866, the system components are pre-connected as follows. Smartphone 804 has one IP connection via IP interface 816 to IP interface 852 of proxy server 850 via local wired or wireless network 814 over channel 812, a second direct wired or wireless interface connection 808 to HID 806 of smartphone 804 to corresponding interface 880 of conversion gateway 874. The IP interface 856 of the proxy server 850 via channels 858 and 864 through the router 848 and the global or any other network 866 is connected to the IP interface 890 of the control computer 882. In turn, the IP interface 876 of the conversion gateway 874 via channels 872 and 868 through the router 848 and the global or any other network 866 is also connected to the wired or wireless IP interface 890 of the control computer 882. All IP interfaces of the proxy server 850 and the conversion gateway 874 are connected to the local network 814 of the smartphone 806.

Thus, the control computer 882, via an IP network, receives broadcast streams of the screen of the smartphone 896 to the monitor 895 and transmits manipulation data of the input devices 897 to the corresponding interface 806 of the smartphone 804. A more detailed description of the interaction of the control computer 882 with the user interface of the smartphone 804 is presented below.

The user of the smartphone 804 activates, through the user interface and a built-in function of the operating system 824, the screen broadcast via channel 810 through the IP interface 816 of the smartphone 804 to the corresponding interface 852 of the proxy server 850 via channel 812. For example, in the case of an iOS smartphone, technology can be used AirPlay, and in the case of an Android smartphone, Chromecast technology can be used. Next, the proxy server 850 in transaction 854 through interface 856 relays the screen broadcast traffic of the smartphone 804 via channels 858 and 864 through the router 848 and network 866 to the IP interface 890 of the control computer 882. Then, through channel 891, the screen broadcast data is sent to the corresponding application 892 for the remote control of the smartphone 804. The application 892 processes the screen broadcast data to display the screen of the smartphone 804 and then, via channel 894, displays the projection of the screen 896 of the smartphone 804 to the monitor 895.

The user of the smartphone 804 then activates, through the user interface, a direct wired or wireless connection of the smartphone input device interface 806 to the corresponding interface 880 of the conversion gateway 874. For example, Bluetooth or USB interfaces may be used.

The user of the control computer 882 then views the projection of the screen 896 of the smartphone 804 on the monitor 895 using input devices 897 (eg, a keyboard and mouse), and manipulates the user interface 806 of the smartphone 804 as follows. The UI manipulation data of the smartphone 804 comes from the input devices 897 through a wired or wireless connection (Bluetooth or USB) to the channel 888 to the corresponding interface 893. Then, via the 886 channel, the UI manipulation data of the smartphone 804 is received by the remote access application 892, which transforms the manipulation data into the appropriate format for transmissions over the IP network, and then sends them via channel 884 to the wired or wireless IP interface 890 of the computer 882. Then the UI manipulation data through interface 890, network 866 and router 848 are sent via channels 868 and 872 to the IP interface 876 of the conversion gateway 874.

Next, the conversion gateway 874 in transaction 878 converts the manipulation data from the IP format into the physical and logical protocol (Bluetooth or USB) of the input interface 806 of the smartphone 804 and transmits it through the interface for HID 880 via channel 808 to the corresponding interface 806 (Bluetooth or USB) smartphone 804. As a result, the smartphone 804 adequately responds to remote manipulation of the smartphone UI 804 by the corresponding input peripheral devices 897 of the control computer 882.

In addition, the functionality of the proxy server 850 and conversion gateway 874 can be built into any system component included in the local network. For example, according to the link, 870 the additional functionality of the proxy server 850 and conversion gateway 874 can be built into a personal computer, tablet, smartphone, IoT microcomputer, or router 848.

Figure 9:
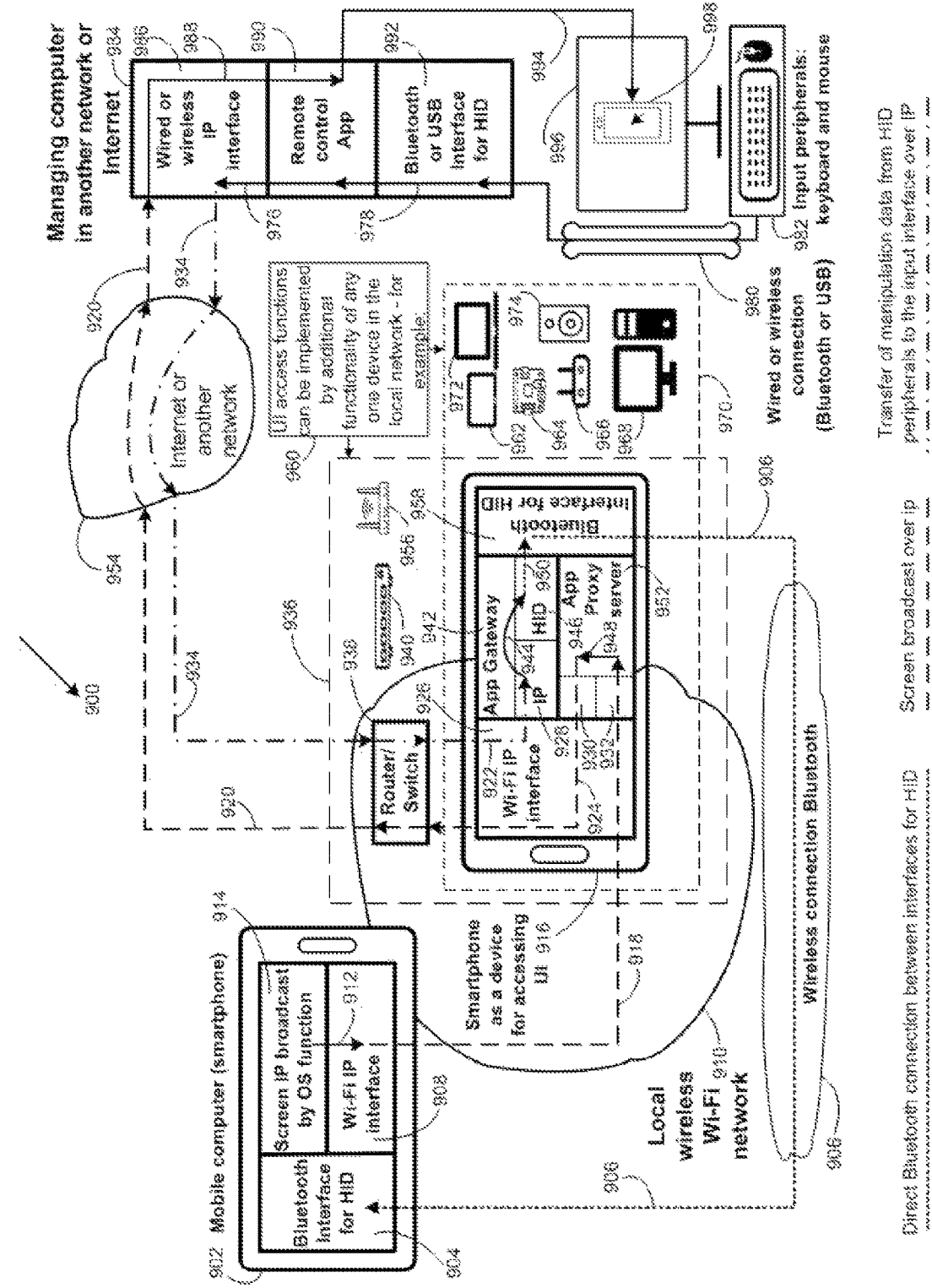
FIG. 9 is a simplified block diagram that illustrates an exemplary implementation of a mobile computer user interface access device based on a suitably configured smartphone in interaction with components of an example mobile computer user interface access system.

FIG. 9 is a simplified block diagram that illustrates an exemplary implementation of a mobile computer 902 user interface access device 916 based on a suitably configured smartphone 916 in interaction with components of an exemplary mobile computer 902 user interface access system.

The corresponding functions for screen relay (proxy server application 952) and conversion of manipulation data from IP to HID (conversion gateway application 942) are performed by a specially configured mobile device (smartphone 916), which is located in the same local Wi-Fi network 910 with a mobile computer (smartphone) 902.

In practice, instead of the smartphone 916, you can use any device 960 connected to the local network 910, containing the functions of relaying mobile computer screen broadcast data and converting IP protocols of manipulation data arriving at the HID interface of the mobile computer (smartphone) 902. For example, you can supplement with these functions the functionality of any "standard" network devices: routers 940, wireless routers 956, computers 968, gateway for IoT devices 966, smart speakers 974, laptops 972, tablets 962, etc. It is also possible to use compact devices based on microcomputer 964, for example, in the format of an IoT device.

The proxy server application 952 and the conversion gateway application 942 are an optional feature of the access device (smartphone 916), which can be implemented in the format of any device connected to the local network 910, and are hereinafter referred to as the proxy server 952 and gateway conversion 942.

The smartphone 902 has one IP connection via the IP interface 908 with the proxy server 952 via the local wireless network 910 via channel 918 (via IP interfaces 908, 926 and 932) and another direct wireless Bluetooth connection 906 interface for the HID 904 smartphone 902 with conversion gateway 942 via the corresponding interface 958 (Bluetooth) of the smartphone 916.

In addition, the IP interface 930 of the proxy server 952 is connected via channels 924 and 920 via Wi-Fi IP interface 926, router 938 and any IP network with Internet access 954 to the wired or wireless IP interface 986 of the control computer 984.

In turn, the IP interface 928 of the conversion gateway 942 via channels 922 and 934 via Wi-Fi IP interface 926, router 938 and any IP network with Internet access 954 is connected to the wired or wireless IP interface 986 of the control computer 984.

Thus, the control computer 984, via an IP network, receives broadcast streams of the screen 998 of the smartphone 902 to the monitor 996 and transmits manipulation data of the input devices 982 for the corresponding interface 904 of the smartphone 902. A more detailed description of the interaction of the control computer 984 with the user interface of the smartphone 902 is presented below.

The user of the smartphone 902 activates, through the user interface and the built-in function of the operating system 914, the broadcast of the screen via channel 912 through the IP interface 908 of the smartphone 902 to the corresponding interface 932 of the proxy server 952 via channel 918. For example, in the case of an iOS smartphone, technology can be used AirPlay, and in the case of an Android smartphone, Chromecast technology can be used. Next, the proxy server 952 in transaction 948 through interface 930 relays the screen broadcast traffic of the smartphone 902 via channels 924 and 920 via Wi-Fi IP interface 926, router 938, any IP network with Internet access 954 to the IP interface 986 of the control computer 984. Then, via channel 988, the screen broadcast data is sent to the corresponding application 990 for remote control of the smartphone 902. Application 990 processes the screen broadcast data to display the screen of the smartphone 902 and then, via channel 994, displays the projection of the screen 998 of the smartphone 902 on the monitor 996.

Next, the user of the smartphone 902 activates, through the user interface, a direct wireless connection between the input device interface 904 of the smartphone 902 and the corresponding interface 946 of the conversion gateway 942 via the Bluetooth interface 958 of the smartphone 916.

The user of the control computer 984 then views the projection of the screen 998 of the smartphone 902 on the monitor 996 using input devices 982 (for example, a keyboard and mouse), and manipulates the user interface of the smartphone 902 as follows. The UI manipulation data of the smartphone 902 comes from the input devices 982 through a wired or wireless connection (Bluetooth or USB) to the channel 980 to the corresponding interface 992. Next, via channel 978, the UI manipulation data of the smartphone 902 is received by the remote access application 990, which transforms the manipulation data into the appropriate format for transmissions over the IP network, and then sends them via channel 976 to the wired or wireless IP interface 986 of the computer 984. Then the UI manipulation data via interface 986 and network 954 is sent via channels 934 and 922 through router 938, Wi-Fi network 910 to IP interface 926 of smartphone 916 to IP interface 928 of conversion gateway 942.

Next, the conversion gateway 942 in transaction 944 converts the manipulation data from the IP format into the physical and logical protocol (Bluetooth) of the input interface 904 of the smartphone 902 and transmits it via the Bluetooth interface for HID 958 via channels 950 and 906 to the Bluetooth interface 904 of the smartphone 902. As a result, the smartphone 902 adequately responds to remote manipulation of the smartphone UI 902 by the corresponding peripheral input devices 982 of the control computer 984.

As noted above, the technological advantages of the presented invention make it possible to implement a service for accessing the user interface of almost any mobile device (including mobile computers manufactured by Apple Corporation) without using corresponding third-party mobile applications. Accordingly, the presented new technology can be used to develop application solutions absolutely within the framework of the security policy of mobile operating systems and without installing additional functions directly on the managed mobile computer.

The drawings and descriptions above are intended primarily to provide an understanding of the principles of the invention and prospects for practical application in the presented embodiments. It is clear that after reading the above material, specialists in this field may suggest some other options for implementing these inventions. Accordingly, the present invention is limited only by the following claims and their equivalents, but is not limited by the foregoing description.

We claim:

1. A method of access, over a global communication network, to a user interface of a mobile computer connected to a first network from a controlling computer connected to a second network different from the first network, the method comprising:
    displaying a broadcast of a screen of the mobile computer on a screen of the controlling computer;
    in response to a manipulation of a peripheral device of the controlling computer, receiving Human Interface Device (HID) format data corresponding to the manipulation of the peripheral device of the controlling computer;
    converting the HID format data corresponding to the manipulation of the peripheral device of the controlling computer into Internet Protocol (IP)-format data corresponding to the manipulation of the peripheral device of the controlling computer;
    transmitting the IP-format data from the controlling computer to the mobile computer via a conversion gateway in communication with both the controlling computer and the interface of peripheral input devices of the mobile computer;
    by the conversion gateway: receiving the IP-format data; converting the received IP-format data into the HID-format data corresponding to the manipulation of the peripheral device of the controlling computer; and transmitting the HID-format data converted from the received IP-format data by the conversion gateway to the interface of peripheral input devices of the mobile computer; and
    in response to receipt, by the interface of peripheral input devices of the mobile computer from the conversion gateway, of the HID-format data by the interface of peripheral input devices of the mobile computer, manipulating, by the interface of the peripheral input devices of the mobile computer, a peripheral input device of the mobile computer that corresponds to the peripheral device of the controlling computer subjected to the manipulation.

2. The method according to claim 1, further comprising broadcasting the screen of the mobile computer on the controlling computer over the global communication network.

3. The method according to claim 1, further comprising relaying broadcast streams of the screen of the mobile computer to the controlling computer via a proxy server; and providing a router or switch that incorporates the conversion gateway and the proxy server.

4. The method according to claim 1, further comprising connecting an IP interface of the conversion gateway to the first network and directly connecting an input device interface of the conversion gateway to the interface of the peripheral input devices of the mobile computer.

5. The method according to claim 4, further comprising directly connecting the interface of the peripheral input devices of the mobile computer with interfaces of additional input devices without participation of the conversion gateway, wherein the additional input devices are used for accessing the user interface of the mobile computer simultaneously with broadcasting of the screen of the mobile computer on a monitor of the controlling computer.

6. The method according to claim 1, further comprising connecting an IP interface of the conversion gateway to the second network and directly connecting an input device interface of the conversion gateway to the interface of the peripheral input devices of the mobile computer.

7. The method according to claim 1, further comprising broadcasting of the screen of the mobile computer on the screen of the controlling computer via the first network.

8. The method according to claim 1, further comprising providing an electronic device connected to the first network and including:
    a proxy server for broadcasting of the screen of the mobile computer on the screen of the controlling computer; and
    the conversion gateway for transmitting the HID-format data of representing the manipulation of the peripheral device of the controlling computer and converted from the IP-format data to the interface of the peripheral input devices of the mobile computer.

9. The method according to claim 1, wherein the first network is a mobile IP network to which the mobile computer is connected, and further comprising broadcasting of the screen of the mobile computer on the screen of the controlling computer and receiving the HID-format data corresponding to the manipulation of the peripheral device of the controlling computer through the mobile IP network to which the mobile computer is connected.

10. The method according to claim 1, further comprising activating the broadcasting of the screen of the mobile computer on the screen of the controlling computer directly by the user of the mobile computer and activating the interface of the peripheral input devices of the mobile computer directly by the user of the mobile computer.

11. The method according to claim 1, wherein the mobile computer is selected from one of: a desktop computer, a server, a workstation, a laptop computer, a portable tablet, a smartphone and a microcomputer.

* * * * *